(12) United States Patent
Meyer

(10) Patent No.: US 12,151,602 B2
(45) Date of Patent: *Nov. 26, 2024

(54) VACUUM EXCAVATOR TANK AND DOOR SYSTEM

(71) Applicant: Vermeer Manufacturing Company, Pella, IA (US)

(72) Inventor: Nathan Meyer, Knoxville, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,858

(22) Filed: Sep. 29, 2023

(65) Prior Publication Data
US 2024/0017658 A1 Jan. 18, 2024

Related U.S. Application Data

(63) Continuation of application No. 17/344,075, filed on Jun. 10, 2021, now Pat. No. 11,801,785.
(Continued)

(51) Int. Cl.
*B60P 3/22* (2006.01)
*E02F 3/90* (2006.01)
(Continued)

(52) U.S. Cl.
CPC ............. *B60P 3/2245* (2013.01); *B60P 3/226* (2013.01); *E02F 3/90* (2013.01); *E05F 15/53* (2015.01); *E02F 3/8816* (2013.01); *E05Y 2201/604* (2013.01); *E05Y 2900/518* (2013.01); *E05Y 2900/53* (2013.01)

(58) Field of Classification Search
CPC ....... E02F 3/8891; E02F 3/8816; E02F 3/925; E02F 5/003; E02F 7/00; B60P 3/22; B60P 3/2245; B60P 3/226; B65D 45/28
See application file for complete search history.

(56) References Cited

U.S. PATENT DOCUMENTS 2,122,517 A 7/1938 Curtis
2,144,586 A 1/1939 Kelley
(Continued)

OTHER PUBLICATIONS

Reimann & Georger Corp., "Brochure for Hydra Core Drill" website: http://www.rgcproducts.com/ available at least as early Jan. 25, 2005 (3 Pages).
(Continued)

*Primary Examiner* — Javier A Pagan
(74) *Attorney, Agent, or Firm* — Michael Best & Friedrich LLP

(57) ABSTRACT

A collection tank for a mobile vacuum excavator includes a front with a closed end, a rear with an open end, a door configured to be closed over the open end, and a linkage assembly having a first end attached to the door and a second end attached to the body. A first pivotal movement drives the first end and second end away from each other, and a second pivotal movement moves the first end and the second end toward each other. An actuator is attached to the first arm and to the second arm so that actuation of the actuator in a first direction drives the first pivotal movement and actuation of the actuator in a second direction drives the second arm the second pivotal movement.

11 Claims, 18 Drawing Sheets

Related U.S. Application Data

(60) Provisional application No. 63/040,394, filed on Jun. 17, 2020.

(51) Int. Cl.
 *E05F 15/53* (2015.01)
 *E02F 3/88* (2006.01)

(56) References Cited

U.S. PATENT DOCUMENTS

| | | |
|---|---|---|
| 2,250,670 A | 7/1941 | Joy |
| 2,448,546 A | 9/1948 | Plemel et al. |
| 2,480,692 A | 8/1949 | Anthony |
| 2,507,522 A | 5/1950 | Heine |
| 2,562,551 A | 7/1951 | Henderson |
| 2,639,601 A | 5/1953 | Miller |
| 3,540,618 A | 11/1970 | Lildal |
| 3,713,472 A * | 1/1973 | Dozois .................... E05F 15/63 49/40 |
| 3,768,203 A | 10/1973 | Bellucci |
| 3,842,461 A | 10/1974 | Wurster |
| 3,888,528 A | 6/1975 | Jericijo |
| 3,968,845 A | 7/1976 | Chaffin |
| 4,119,238 A | 10/1978 | Ja'afar et al. |
| 4,155,586 A | 5/1979 | Flynn |
| 4,307,541 A | 12/1981 | Farmer et al. |
| 4,322,868 A | 4/1982 | Wurster |
| 4,334,633 A | 6/1982 | Piegza |
| 4,434,861 A | 3/1984 | Howeth |
| 4,510,714 A | 4/1985 | Kasper et al. |
| 4,518,095 A | 5/1985 | Engwert |
| 4,655,362 A | 4/1987 | Ecker et al. |
| 4,659,262 A | 4/1987 | van Aalst |
| 4,669,628 A | 6/1987 | Hatta |
| 4,842,223 A | 6/1989 | Allton et al. |
| 4,936,031 A | 6/1990 | Briggs et al. |
| 5,016,717 A | 5/1991 | Simons et al. |
| 5,021,156 A | 6/1991 | Sloan |
| 5,092,963 A | 3/1992 | Barker et al. |
| 5,140,759 A | 8/1992 | Artzberger |
| 5,141,528 A | 8/1992 | Boczkiewicz et al. |
| 5,191,993 A | 3/1993 | Wanger et al. |
| 5,287,602 A | 2/1994 | Dykstra |
| 5,295,317 A | 3/1994 | Perrott |
| 5,299,370 A | 4/1994 | Gyori et al. |
| 5,408,766 A | 4/1995 | Pobihushchy |
| 5,425,188 A | 6/1995 | Rinker |
| 5,487,229 A | 1/1996 | Nathenson et al. |
| 5,500,976 A | 3/1996 | Rohrbacher et al. |
| 5,515,625 A | 5/1996 | Keigley |
| 5,791,073 A | 8/1998 | Palmer et al. |
| 5,860,232 A | 1/1999 | Nathenson et al. |
| 5,996,171 A | 12/1999 | Bowers |
| 6,000,151 A | 12/1999 | Hayes |
| D423,521 S | 4/2000 | Walter et al. |
| 6,202,330 B1 | 3/2001 | Bolton |
| 6,273,512 B1 | 8/2001 | Rajewski |
| 6,360,458 B2 | 3/2002 | Dolister |
| 6,386,598 B1 | 5/2002 | Dykstra et al. |
| 6,397,967 B1 | 6/2002 | McIlwraith |
| 6,470,605 B1 | 10/2002 | Gilman et al. |
| 6,499,934 B1 | 12/2002 | Kaczmarski et al. |
| 6,517,292 B1 | 2/2003 | Landau |
| 6,604,304 B1 | 8/2003 | Slabach et al. |
| 6,615,849 B1 | 9/2003 | Gilman et al. |
| 6,988,568 B2 | 1/2006 | Buckner |
| 7,234,252 B2 | 6/2007 | Jarnecke et al. |
| 7,415,748 B1 | 8/2008 | Guhr et al. |
| 7,484,322 B2 | 2/2009 | Maybury, Jr. et al. |
| 7,503,134 B2 | 3/2009 | Buckner |
| 7,523,570 B2 | 4/2009 | Pobihushchy |
| 7,644,523 B2 | 1/2010 | Buckner |
| 7,743,537 B2 | 6/2010 | Maybury, Jr. |
| 7,837,050 B2 | 11/2010 | Maybury, Jr. |
| 8,066,140 B1 | 11/2011 | Young et al. |
| 8,127,959 B2 | 3/2012 | Gloor et al. |
| 8,336,231 B2 | 12/2012 | Maybury, Jr. et al. |
| 8,360,260 B2 | 1/2013 | Maybury, Jr. |
| 8,667,717 B2 | 3/2014 | Maybury, Jr. et al. |
| 8,925,753 B2 | 1/2015 | Maybury, Jr. |
| 9,057,180 B1 | 6/2015 | Sewell |
| 9,260,048 B2 | 2/2016 | Maybury, Jr. |
| 9,260,049 B2 | 2/2016 | Maybury, Jr. |
| 9,260,050 B2 | 2/2016 | Maybury, Jr. |
| 9,399,853 B2 | 7/2016 | Maybury et al. |
| 9,816,250 B2 | 11/2017 | Maybury et al. |
| 9,821,953 B2 | 11/2017 | Sewell et al. |
| 10,207,863 B2 | 2/2019 | Sewell et al. |
| 10,221,602 B2 | 3/2019 | Sewell |
| 10,337,167 B2 | 7/2019 | Maybury, Jr. |
| 10,538,949 B2 | 1/2020 | Sewell |
| 10,563,375 B2 | 2/2020 | Maybury |
| 10,844,575 B2 | 11/2020 | Maybury, Jr. |
| 11,041,287 B2 | 1/2021 | Maybury, Jr. |
| 11,499,290 B2 | 11/2022 | Strobel |
| 11,801,785 B2 * | 10/2023 | Meyer .................... E05F 15/53 |
| 2004/0108317 A1 | 6/2004 | Buckner |
| 2005/0210623 A1 | 9/2005 | Buckner |
| 2006/0032095 A1 | 2/2006 | Buckner |
| 2006/0086010 A1 | 4/2006 | Jarnecke et al. |
| 2006/0117612 A1 | 8/2006 | Hackett et al. |
| 2007/0261309 A1 | 11/2007 | Tommell et al. |
| 2008/0066383 A1 | 3/2008 | Decker et al. |
| 2008/0085163 A1 | 4/2008 | Maybury |
| 2008/0244859 A1 | 10/2008 | Maybury |
| 2009/0133296 A1 | 5/2009 | Maybury, Jr. et al. |
| 2010/0320204 A1 | 12/2010 | Maybury, Jr. |
| 2011/0107548 A1 | 5/2011 | Maybury, Jr. |
| 2011/0258890 A1 | 10/2011 | Maybury, Jr. et al. |
| 2012/0317882 A1 | 12/2012 | Zazula |
| 2013/0062893 A1 | 3/2013 | Mclaughlin et al. |
| 2013/0111786 A1 | 5/2013 | Maybury, Jr. et al. |
| 2013/0134163 A1 | 5/2013 | Maybury, Jr. et al. |
| 2014/0182173 A1 | 7/2014 | Maybury et al. |
| 2014/0230937 A1 | 8/2014 | Maybury, Jr. |
| 2014/0230938 A1 | 8/2014 | Maybury, Jr. |
| 2014/0239624 A1 | 8/2014 | Maybury, Jr. |
| 2015/0291350 A1 | 10/2015 | Sewell et al. |
| 2017/0145656 A1 | 3/2017 | Maybury et al. |
| 2017/0292306 A1 * | 10/2017 | Sewell .................. E05F 1/1091 |
| 2018/0066410 A1 | 3/2018 | Maybury, Jr. et al. |
| 2018/0072493 A1 | 3/2018 | Sewell et al. |
| 2018/0327999 A1 * | 11/2018 | Bural .................... E02F 3/8816 |
| 2020/0181875 A1 * | 6/2020 | Maybury, Jr. .......... E02F 5/003 |
| 2020/0291675 A1 | 9/2020 | Niemczewski |
| 2021/0189685 A1 | 6/2021 | Maybury, Jr. |

OTHER PUBLICATIONS

RockVac, Product Brochure, available at least as early as Dec. 27, 2010 (1 Page).

SerVac, Product Brochure, available at least as early as Dec. 27, 2010 (1 Page).

Extended Search Report for European Patent Office for related Application No. EP 21179220.5 dated Nov. 12, 2021 (7 Pages).

* cited by examiner

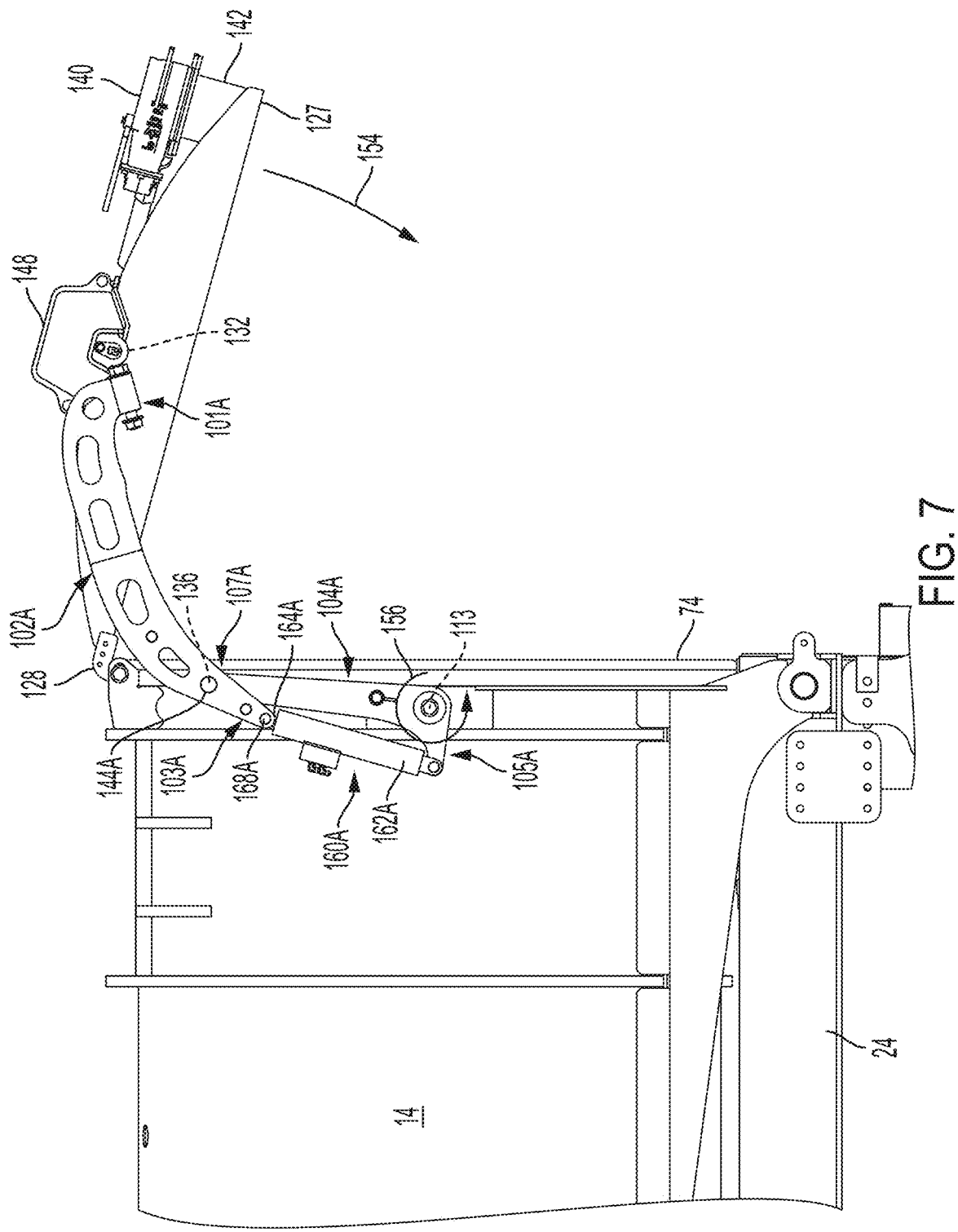

VACUUM EXCAVATOR TANK AND DOOR SYSTEM

RELATED APPLICATIONS

This application is a continuation of U.S. application Ser. No. 17/344,075 filed Jun. 10, 2021, which claims the benefit of U.S. Provisional Patent Application No. 63/040,394 filed Jun. 17, 2020, the entire contents of which are hereby incorporated by reference herein.

FIELD OF THE INVENTION

The present disclosure relates generally to a vacuum excavator system for removing soil to expose underground utilities (such as electrical and cable services, water and sewage services, etc.), and more particularly to an improved vacuum tank and door system for use with such system.

BACKGROUND OF THE INVENTION

With the increased use of underground utilities, it has become more important to locate and verify the placement of buried utilities before installation of additional underground utilities or before other excavation or digging work is performed. Conventional digging and excavation methods such as shovels, post hole diggers, powered excavators, and backhoes may be limited in their use in locating buried utilities as they may tend to cut, break, or otherwise damage the lines during use.

Devices have been previously developed to create holes in the ground to non-destructively expose underground utilities to view. One design uses high pressure air delivered through a tool to loosen soil and a vacuum system to vacuum away dirt after it is loosened to form a hole. Another system uses high pressure water delivered by a tool to soften the soil and create a soil/water slurry mixture. The tool is connected with a vacuum system for vacuuming the slurry away into a collection tank. The tank may then be emptied by opening a door on the tank.

Certain prior art vacuum systems are provided with a tank having a manually closing door that is locked in a closed position by latches, locks or other suitable locking mechanisms. Another example of a prior door system is presented in U.S. Pat. No. 7,837,050, the entire disclosure of which is incorporated herein for all purposes.

SUMMARY OF THE INVENTION

An embodiment of the present disclosure provides a collection tank for a mobile vacuum excavator, including a generally cylindrical body having a front with a closed end, a rear with an open end having a periphery, a door having a periphery that abuts the periphery of the open end when the door is closed over the open end, and a linkage assembly having a first end attached to the door so that the first end moves with movement of the door and a second end attached to the body of the collection tank. The linkage assembly includes a first arm, a second arm pivotally attached to the first arm so that a first pivotal movement of the first arm and the second arm with respect to each other drives the first end and the second end away from each other and so that a second pivotal movement of the first arm and the second arm with respect to each other moves the first end and the second end toward each other. An actuator is attached to the first arm and to the second arm so that the actuator moves with movement of the first arm and with movement of the second arm and so that actuation of the actuator in a first direction moves the first arm and the second arm in the first pivotal movement and so that actuation of the actuator in a second direction moves the first arm and the second arm in the second pivotal movement.

In another embodiment, a collection tank for a mobile vacuum excavator includes a generally cylindrical body including a front with a closed end, a rear with an open end having a periphery, a door having a periphery that abuts the periphery of the open end when the door is closed over the open end, and a linkage assembly having a first arm pivotally attached to the body at a mounting end about a mount axis, a second arm pivotally attached to the door at a mounting end about a door closure axis, so that the mounting end moves with movement of the door, and pivotally attached to the first arm at a door latch axis. A first pivotal movement of the first arm and the second arm with respect to each other drives the mounting end of the first arm and the mounting end of the second arm away from each other and a second pivotal movement of the first arm and the second arm with respect to each other drives the mounting end of the first arm and the mounting end of the second end toward each other, wherein the second arm has a distal end and wherein a door latch plane is defined by the mount axis and the door closure axis. A powered cylinder actuator is attached to the first arm and to the second arm so that the actuator moves with movement of the first arm and with movement of the second arm and so that retraction of the actuator moves the first arm and the second arm in the first pivotal movement and so that extension of the actuator in a second direction moves the first arm and the second arm in the second pivotal movement, wherein the door latch axis is on one side of the door latch plane when the actuator is in a retracted state and the door latch axis is on an opposite side of the door latch plane when the actuator is in an extended state.

In a further embodiment, a collection tank for a mobile vacuum excavator has a generally cylindrical body having a front with a closed end, and a rear with an open end having a periphery. A door has a periphery that abuts the periphery of the open end when the door is closed over the open end. A linkage assembly has a first end attached to the door and a second end attached to the body. The linkage assembly comprises a first arm, a second arm pivotally attached to the first arm so that a first pivotal movement of the first arm and the second arm with respect to each other drives the first end and the second end away from each other and so that a second pivotal movement of the first arm and the second arm with respect to each other moves the first end and the second end toward each other, and a linear actuator attached at a first operative end of the linear actuator to one of the first arm and the second arm, so that the first operative end of the linear actuator moves with movement of the one of the first arm and the second arm, and at a second operative end of the linear actuator to the body proximate the second end of the linkage assembly so that actuation of the linear actuator in a first direction moves the first arm and the second arm in the first pivotal movement and so that actuation of the actuator in a second direction moves the first arm and the second arm in the second pivotal movement.

In a still further embodiment, a collection tank for a mobile vacuum excavator has a generally cylindrical body having a front with a closed end, and a rear with an open end having a periphery. A door has a periphery that abuts the periphery of the open end when the door is closed over the open end. A linkage assembly has a first end attached to the door so that the first end moves with movement of the door and a second end attached to the body. The linkage assembly has a first arm, a second arm pivotally attached to the first arm so that a first pivotal movement of the first arm and the second arm with respect to each other drives the first end and the second end away from each other and so that a second pivotal movement of the first arm and the second arm with respect to each other moves the first end and the second end toward each other, and a linear actuator. The linear actuator is attached at a first operative end of the linear actuator to one of the first arm and the second arm so that the first operative end of the linear actuator is movable about a first axis during the first pivotal movement and the second pivotal movement and at a second operative end of the linear actuator to the body so that the second operative end of the linear actuator is movable about a second axis during the first pivotal movement and the second pivotal movement, and so that actuation of the linear actuator in a first direction moves the first arm and the second arm in the first pivotal movement and so that actuation of the linear actuator in a second direction moves the first arm and the second arm in the second pivotal movement. The linear actuator is attached to the one of the first arm and the second arm and to the body so that, when the door is closed over the open end, the second axis is between the open end and the first axis.

In yet another aspect, a collection tank for a mobile excavator has a generally cylindrical body with a tank centerline, a front with a closed end, and a rear with an open end having a sealing flange that defines a first plane perpendicular to the tank centerline. A door is pivotally connected to the generally cylindrical body and has a periphery that abuts the sealing flange of the open end when the door is closed over the open end. A first linkage arm has an end pivotally connected to the body. A second linkage arm has a first end pivotally connected to the door and a second end. When the door is closed over the open end, the first end of the second linkage arm is rearward of the first plane and the second end of the second linkage arm is forward of the first plane. An actuator has a first end that is pivotally connected to one of the first linkage arm or the second linkage arm at a first pivot point lying in a third plane that is perpendicular to the tank centerline, and a second end having a second pivot point located between the first plane and the third plane. The first pivot point and the second pivot point lie in a plane that is parallel to or generally parallel to the tank centerline.

BRIEF DESCRIPTION OF THE DRAWINGS

A full and enabling description of the present disclosure, including the best mode thereof directed to one of ordinary skill in the art, is set forth in the specification, which makes reference to the appended figures, in which:

FIG. 7 is a partial plan side view of the collection tank door system as shown in FIG. 4, in a fully open position;

Figure 1:
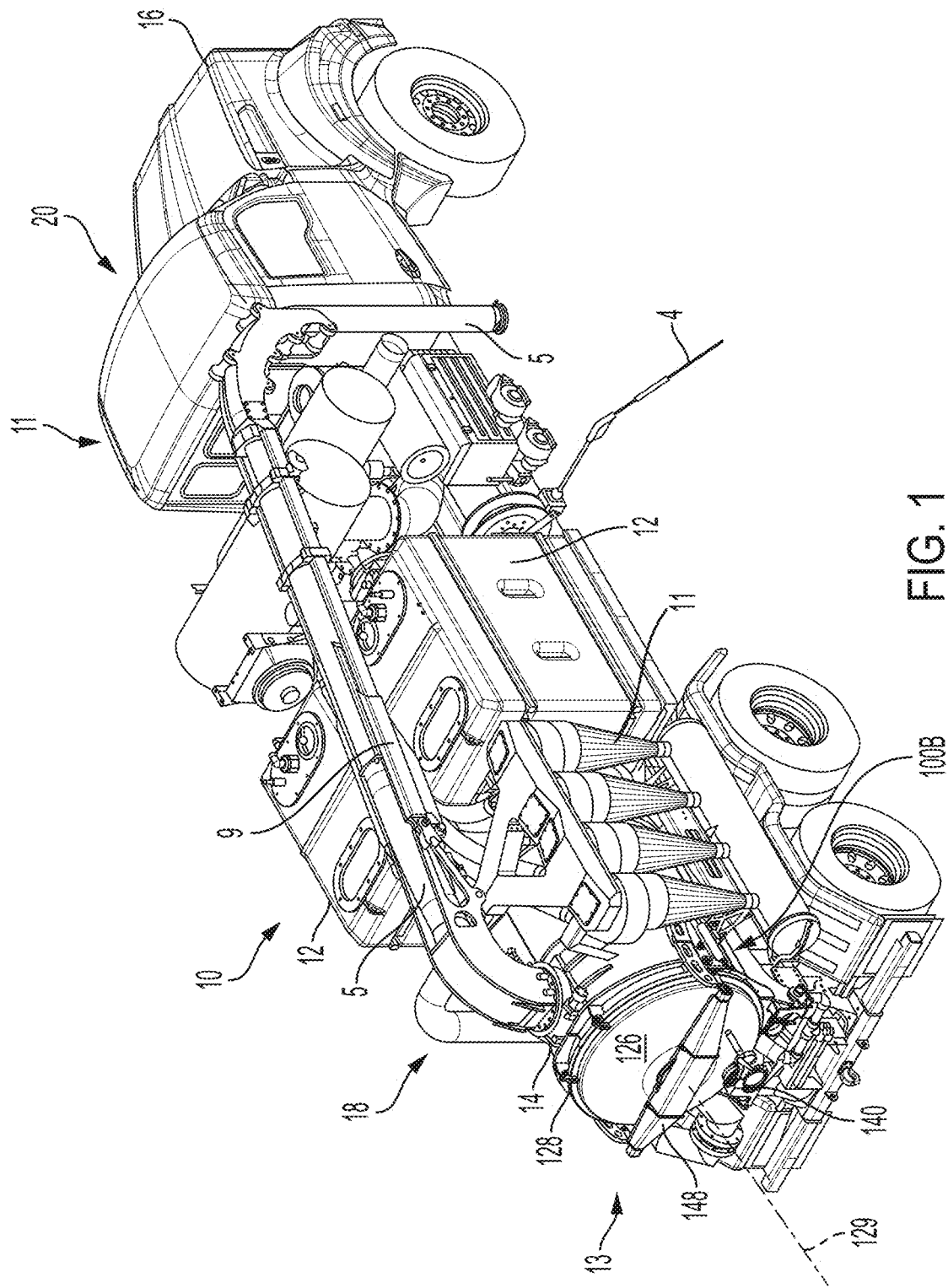
FIG. 1 is a perspective view of a vacuum-operated earth excavator system including a collection tank door system in accordance with an embodiment of the present disclosure.

Repeat use of reference characters in the present specification and drawings is intended to represent same or analogous features or elements of the disclosure.

DETAILED DESCRIPTION

Reference will now be made in detail to embodiments of the disclosure, one or more examples of which are illustrated in the accompanying drawings. Each example is provided by way of explanation of the disclosure, not limitation of the disclosure. In fact, it will be apparent to those skilled in the art that modifications and variations can be made in the present disclosure without departing from the scope and spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

It should be understood that terms of orientation, e.g. "forward," "rearward," "upper," "lower," "horizontal," "vertical," and similar terms as used herein are intended to refer to relative orientation of components of the devices described herein with respect to each other under an assumption of a consistent point of reference but do not require any specific orientation of the overall system. Thus, for example, the discussion herein may refer to a "forward" or "front" end of an earth excavation system or a generally cylindrical collection tank used therewith, referring to a direction toward the end of the earth excavator that has a motorized cab or that is configured in a trailer configuration to be attached to a vehicle rear end, or a "rearward" end of the earth excavation system or tank, referring to a direction toward the system's rear, at which the tank door is disposed and opens and closes against the open end of the tank. The present discussion may also refer to "upper" and/or "lower" surfaces of the earth excavation system and/or its components, generally with regard to the orientation of the system as shown in FIGS. 1 and 2. Terms such as "horizontal" and "vertical," for example, refer to orientations under an assumption that an earth excavation system as in FIGS. 1 and 2 is disposed in its operative position, such as shown at those figures, on a level, horizontal surface. Such terms may be used in the present disclosure and claims and will be understood to refer to a relative orientation but not to an orientation of the earth excavation system or its tank with respect to an external frame of reference. Further, the term "end" should be understood to encompass a part of something and an inward of a boundary or edge thereof, rather than just the boundary or edge.

Further, either of the terms "or" and "one of _____ and _____," as used in this disclosure and the appended claims, is intended to mean an inclusive "or" rather than an exclusive "or." That is, unless specified otherwise, or clear from the context, either of the phrases "X employs A or B" and "X employs one of A and B" is intended to mean any of the natural inclusive permutations. That is, either phrase is satisfied by any of the following instances: X employs A; X employs B; or X employs both A and B, and this is true of similar phrases, such as "at least one of A or B" or "at least one of A and B," that may be utilized in the specification or claims. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. Also, as used herein, the term "attach" means to fasten, join together. An attachment, therefore, may refer to a direct or an indirect connection between two or more things, and "attach," with respect to two or more components A and B, may refer to fastening/joining A and B to each other directly, so that they physically touch each other, or indirectly, so that they are joined to each other through one or more other components.

Figure 2A:
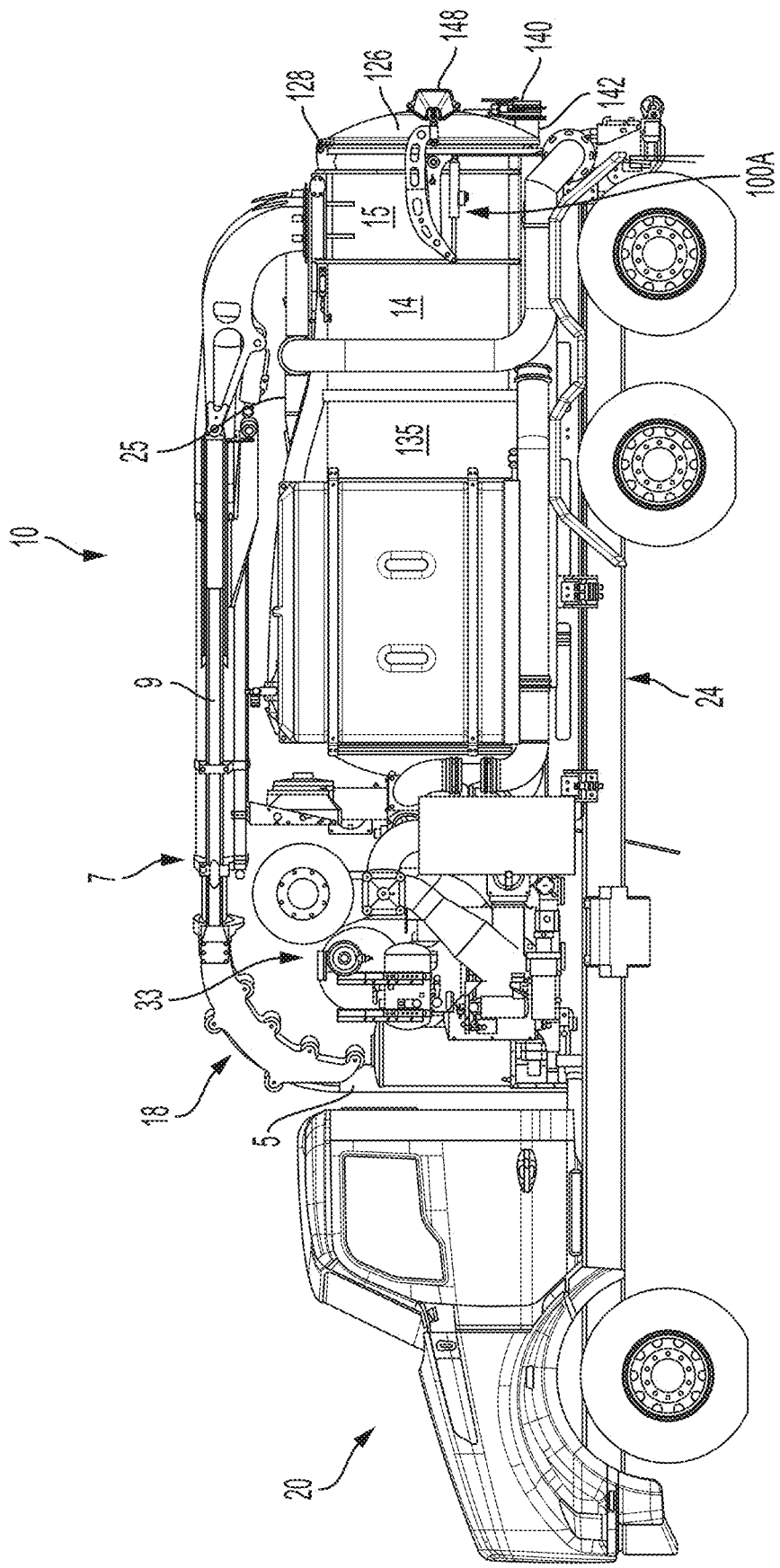
FIG. 2A is a side plan view of the vacuum-operated earth excavator system of FIG. 1.
Figure 2B:
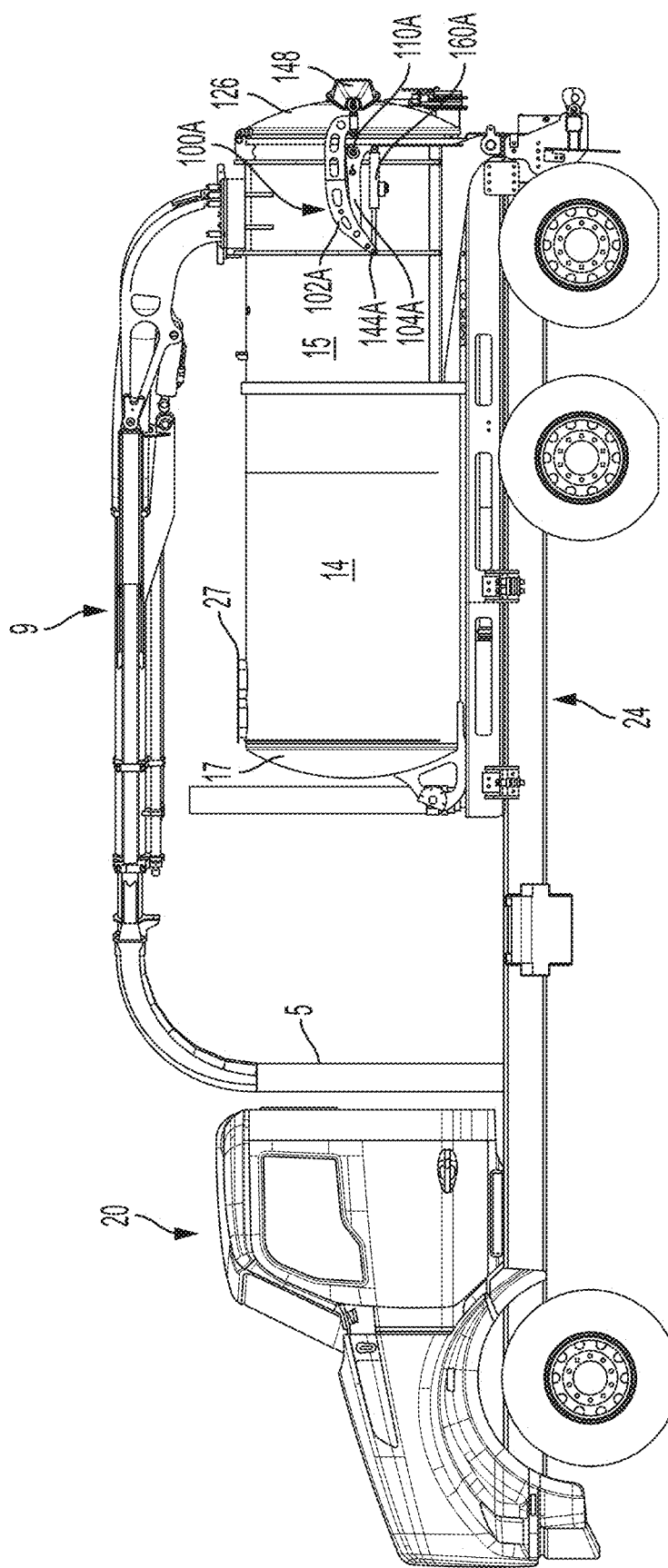
FIG. 2B is a side plan view of the vacuum-operated earth excavator system as in FIG. 2A, with certain components as in FIGS. 1 and 2A omitted for view of a collection tank.
Figure 2C:
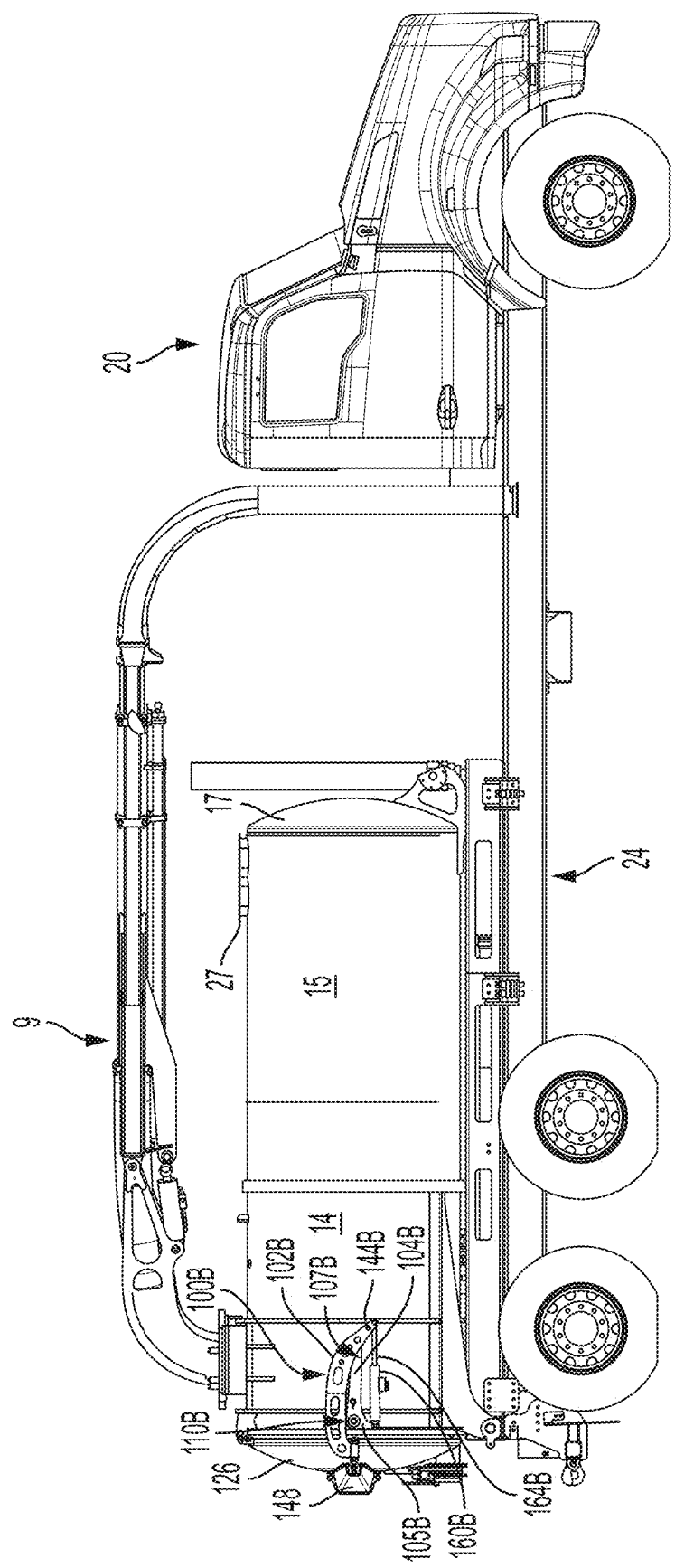
FIG. 2C is a side plan view of the vacuum-operated earth excavator system as in FIG. 2A, viewed from a side of the system opposite of the view of FIG. 2*a* and with certain components as in FIGS. 1 and 2A omitted for view of a collection tank.

Referring to FIGS. 1 and 2 (which should be understood to encompass FIGS. 2A, 2B, and 2C), an earth excavator system 10 generally includes a water reservoir tank (in this embodiment, a pair of tanks) 12, a collection tank 14, a motor 16 (which, in the illustrated embodiment may be the vehicle engine, delivering power through, e.g., a mechanical, hydraulic, or electric transmission system, but which may also be, e.g., a dedicated motor mounted on the chassis aft of the vehicle cab), and an earth removal system 18, all mounted on a mobile chassis 24 that supports the various components. In the present embodiment, excavator system 10 includes chassis 24 of a motor vehicle 20 (which may also be considered part of the excavator system). It should be understood that while the herein described components of earth excavator system 10 are illustrated mounted on chassis 24 of a self-propelled motor vehicle 20 with a dedicated motor that propels the apparatus, the system may also be supported on the chassis of a trailer (not shown) that can be towed or otherwise moved by a motorized vehicle such as a car, truck, or skid steer and that may therefore include a tongue and/or hitch coupler to connect to the separate vehicle. It should be understood that the components of the system may be either directly mounted to the chassis or indirectly mounted to the chassis through connections with other system components. Apparatus 10 includes a front 11, a rear 13, and a longitudinal axis 129 that extends through front 11 and rear 13.

Figure 3B:
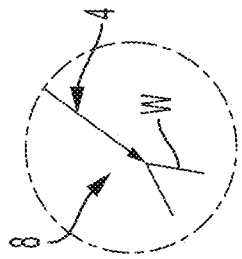
FIG. 3B is a detail view of part of the system as shown in FIG. 3A.
Figure 3A:
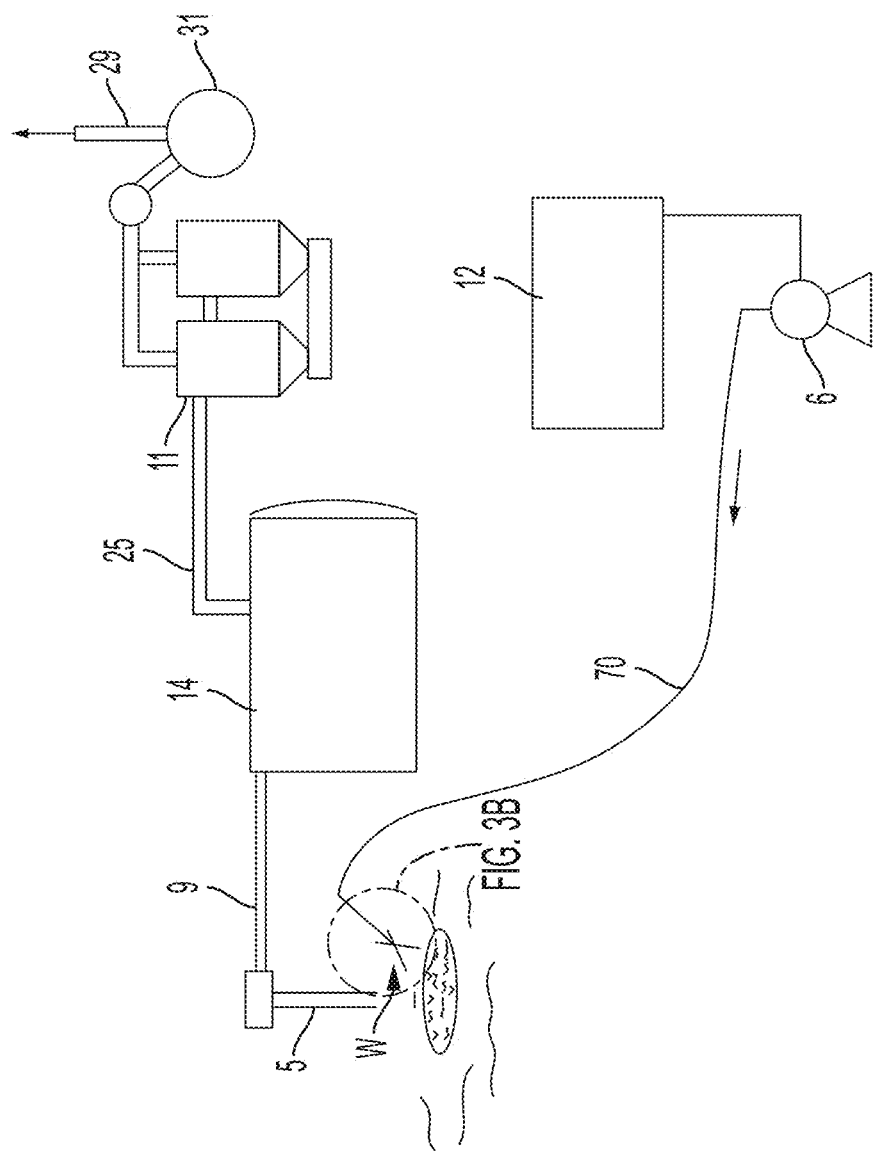
FIG. 3A is a schematic view of the hydraulic, electric, water, and vacuum systems of the vacuum-operated earth excavator system of FIGS. 1 and 2.

The connections of the various components of system 10 are illustrated schematically in FIG. 3. Referring to FIGS. 1, 2, and 3, the vacuum excavator system 10 includes a wand 4 (FIG. 3B) for directing pressurized water W toward earthen material to cut the earthen material. Wand 4 is connected to an excavation fluid pump 6 that supplies water to wand 4 via a high-pressure water hose 70. Pump 6 may supply a pressure of, for example, at least about 500 psi or at least about 1,000 psi (e.g., from about 1,000 psi to about 5,000 psi or from 1,000 psi to about 3,000 psi).

In some embodiments, wand 4 includes a rotary nozzle 8 (FIG. 3B) for directing water W toward the earthen material to cut the earthen material. Generally, any rotary nozzle that causes the water to be directed toward the earthen material in a circular path at the site of the excavation may be used. Such rotary nozzles may include a rotor insert with blades that rotate around a longitudinal axis of the nozzle when water is forced through the nozzle. The rotor insert may include three or more channels that force fluid to flow in different pathways through the rotor insert to cause the water to move along a circular path as it contacts the excavation material (i.e., the water moves within a cone that extends from the nozzle toward the excavated material). In other embodiments, a straight tip nozzle that directs fluid along a straight path in a concentrated jet may be used. High-pressure water hose 70 is connected, via a valve, to fluid pump 6 to provide water to the earth removal system as selected by the user. As the system is used to dig a hole, a distal end of wand 4 is pressed downwardly into the ground. For larger diameter holes, wand 4 is moved in a generally circular manner as it is pressed downward, thereby removing material from a large cross-section area. Slurry formed in the hole is vacuumed through hose 5 and accumulates in collection tank 14. Once the excavation is completed and the utility is exposed, the vacuum system can be shut down, and the operators may examine or repair the utility as needed.

Vacuum excavation system 10 includes a vacuum system 7 (FIG. 2A) for removing spoil material from the excavation site. Spoil material or simply "spoils" may include, without limitation, rocks, cut earthen material (e.g., small particulate such as sand to larger pieces of earth that are cut loose by the jet of high pressure water), slurry, and water used for excavation. The spoil material may have a consistency similar to water, a slurry, or even solid earth, organic material, or rocks. The terms used herein for materials that may be processed by the vacuum excavation system such as, for example, "spoils," "spoil material," "cut earthen material" and "water," should not be considered in a limiting sense unless stated otherwise.

Vacuum system 7 includes a vacuum pump system 33 and a boom 9 that is capable of rotating toward the excavation site to remove material from the excavation site. Boom 9 may include a flexible portion, such as a hose, 5 (FIGS. 1 and 3A) that extends downward to the ground to vacuum spoil material from the excavation site. Flexible portion 5 may be manipulated by a user to direct the vacuum suction toward the excavation site.

Vacuum system 7 acts to entrain the cut earth and the water used to excavate the site in a stream of air. A blower or vacuum pump 31 (FIG. 3A) pulls a vacuum through boom 9 to entrain the material in the airstream. Air is discharged from the blower 31 after material is removed from the airstream.

The airstream having water and cut earth entrained therein is pulled through boom 9 and through a series of conduits and is pulled into collection tank 14. The collection tank 14 removes at least a portion of cut earthen material and water from the airstream. Air exits one or more collection tank air outlets 27 through one or more conduits 25 and is introduced into cyclones 11 (FIGS. 1 and 3A) via conduit 25 to remove additional spoil material (e.g., water, small solids such as sand, low density particles such as sticks and grass, and the like) not separated in the collection tank. Material that collects in the bottom of the cyclones 11 is conveyed by a cyclone discharge pump (e.g., peristaltic pump) or, alternatively, is gravity fed to a dewatering system. The air removed from cyclones 11 is introduced into one or more filter elements before entering vacuum pump 31. Vacuum pump 31 may be disposed in or near the engine compartment. Air is removed from the apparatus through a vacuum exhaust 29.

Vacuum pump 31 generates vacuum in the system to pull water and cut earthen material into system 10 for processing. In some embodiments, vacuum pump 31 is a positive displacement pump. Such positive displacement pumps may include dual-lobe or tri-lobe impellers (e.g., a screw rotor) that draw air into a vacuum side of the pump and forces air out the pressure side. The pump may be powered by a motor having a power output of, for example, at least 75 hp, at least 100 hp or even at least 125 hp.

One or more example vacuum excavation systems such as may be utilized with or encompassed by the systems and methods disclosed herein are disclosed in the U.S. patent application Ser. No. 16/630,057, entitled "Hydro Excavation Vacuum Apparatus Having Deceleration Vessels and Methods for Hydro Excavating a Site, filed Jan. 10, 2020, the entire disclosure of which is incorporated by reference herein for all purposes.

Figure 4:
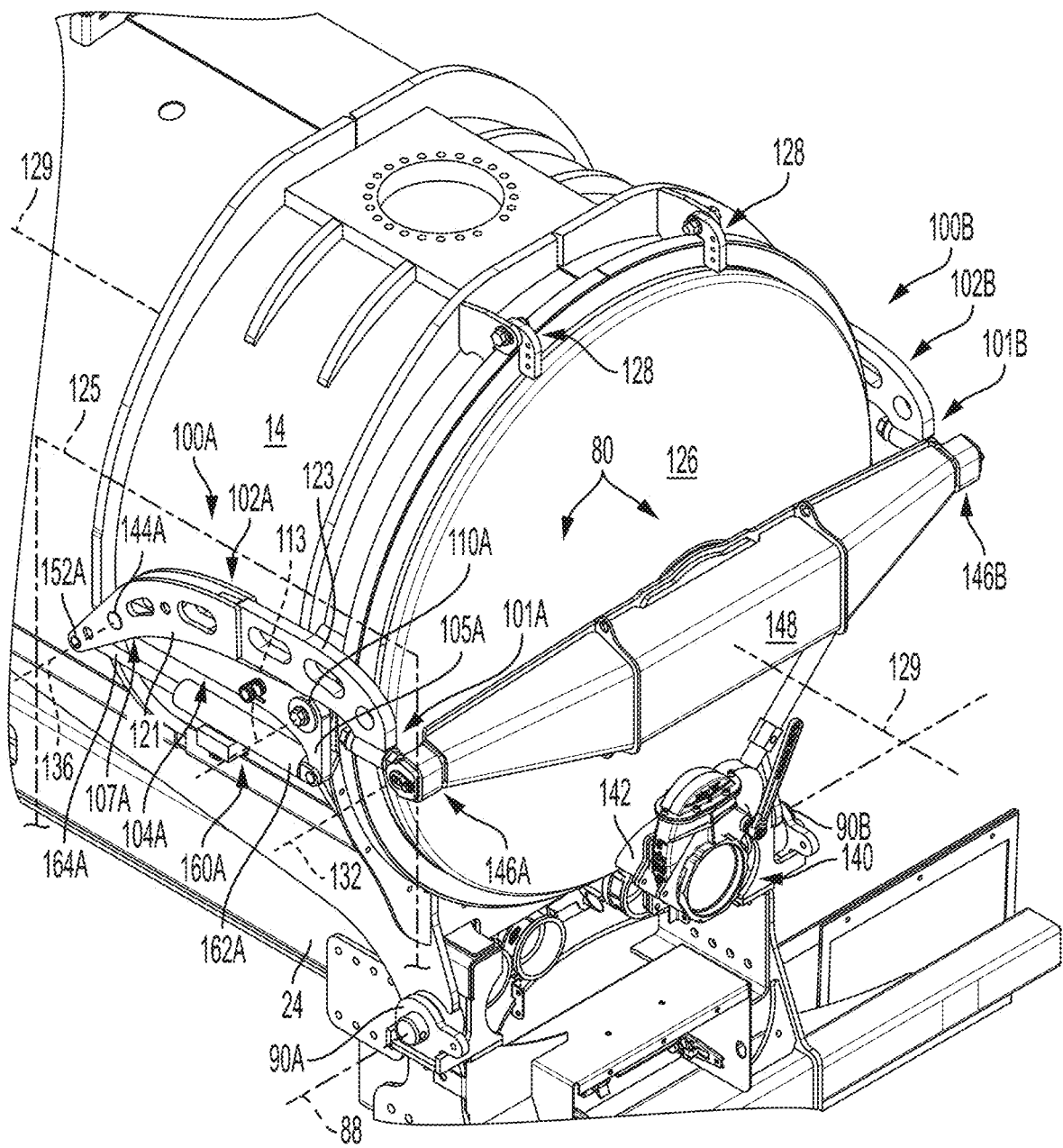
FIG. 4 is a partial perspective view of the collection tank of the earth excavator shown in FIGS. 1 and 2, including a collection tank door system in accordance with an embodiment of the present disclosure, with certain components hidden.
Figure 8:
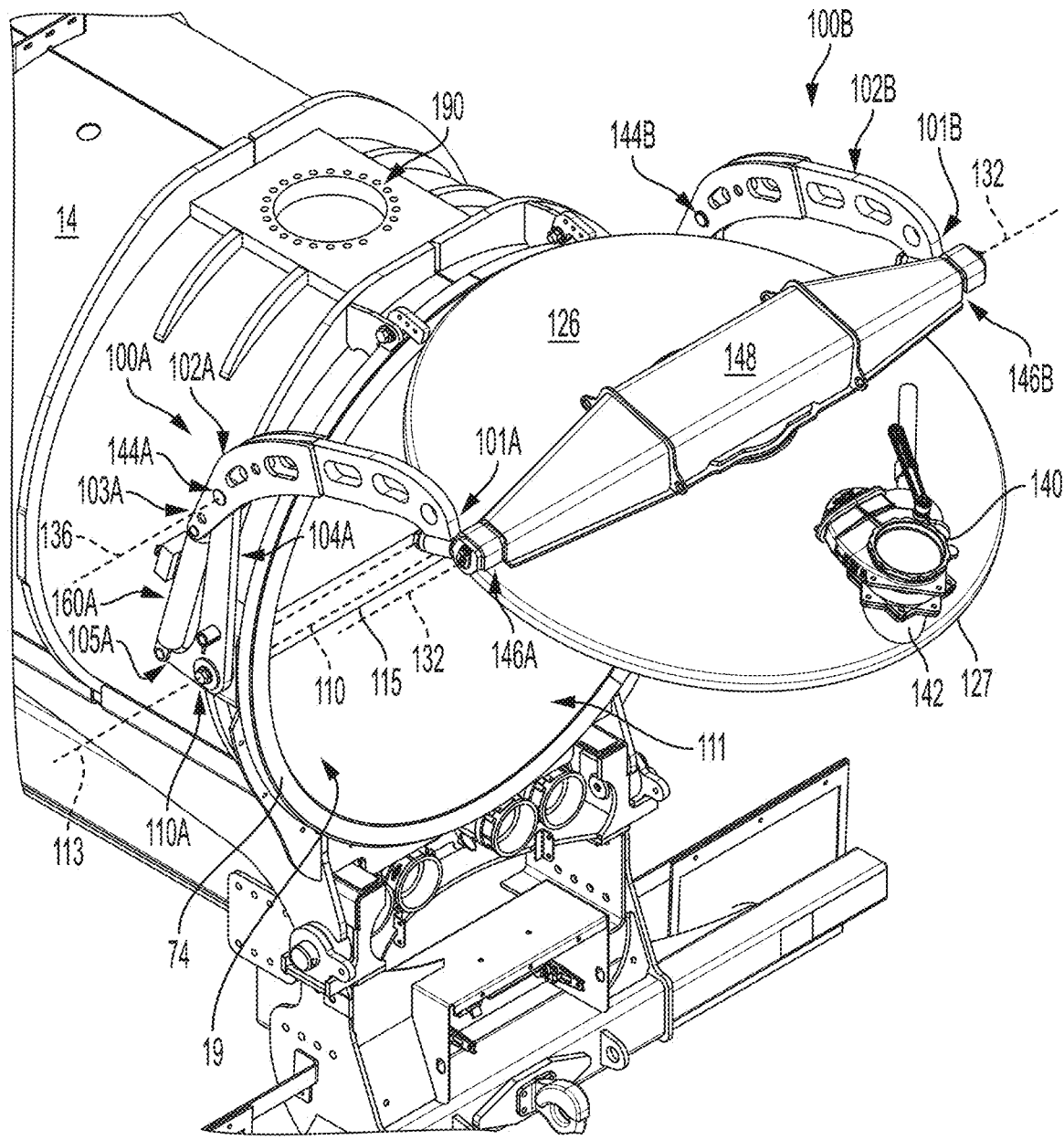
FIG. 8 is a partial perspective view of the collection tank door system as shown in FIG. 4, in a fully open position.

Referring additionally to FIG. 4, collection tank 14 has a generally cylindrical body 15 having a closed front end 17 (FIGS. 2B and 2C) and open rear end 19 (FIG. 8). A discharge door 126 is connected to the open rear end 19 of the tank body 15 by a hinge 128 that allows the door 126 to swing open, thereby providing access to the tank's interior for cleaning. A pair of hydraulic cylinders may be provided for tilting the forward end of tank 14 upwards in order to cause the contents to run towards discharge door 126. A gate valve 140, coupled to a drain 142 in discharge door 126, drains the liquid portion of the slurry in tank 14 without requiring the door to be opened. Gate valve 140 may also be used to introduce air into collection tank 14 to reduce the vacuum in the tank so that the door 126 may be more easily opened.

Optionally running the length of the interior of collection tank 14 is a nozzle tube that includes nozzles for directing high pressure water about the interior of the tank, and particularly towards the base of the tank. The nozzles are actuated by opening a valve connected to a water pump (e.g. water pump 6), which delivers high pressure water from the pump to the nozzles for producing a vigorous cleaning action in the tank. When the nozzles are not being used for cleaning, a small amount of water is allowed to continuously drip through the nozzles to pressurize them so as to prevent dirt and slurry from entering and clogging the nozzles.

The hydraulic cylinders, used to tilt collection tank 14, may be powered, e.g., by an electric hydraulic pump (not shown) provided for the purpose, by the power source (engine) of the truck, or by the independent power source for the vacuum. The hydraulic pump connects to a hydraulic reservoir and is driven by the electrical system provided from the motor. A high-pressure output line and a return line connect the hydraulic pump to the hydraulic cylinders.

Earth excavator system 10 can be used to dig multiple holes before having to empty collection tank 14. However, once collection tank 14 is full, it can be emptied at an appropriate dump site. When ready to open discharge door 126, vacuum pump 31 is shut down, and the vacuum pressure is released so that air enters the tank, thereby allowing the internal pressure of the tank to match the ambient atmospheric pressure and allowing the door to be opened. Once the door is opened, the hydraulic cylinders can be activated to raise forward end 17 (FIG. 2) upward, dumping the slurry from the tank. For this purpose, tank 14 is pivotally attached to chassis 24 (FIGS. 1 and 2) at a pair of hinges 90A and 90B that include relatively pivotable portions that pivot about an axis 88 (FIG. 4) transverse to axis 129 to allow tank 14 to pivot about axis 88 as the hydraulic cylinders move the tank's forward end up and down, and such that when the hydraulic cylinders push the tank's forward end upward, liquid and solid matter retained in collection tank 14 may be discharged through the tank's open end.

Figure 5A:
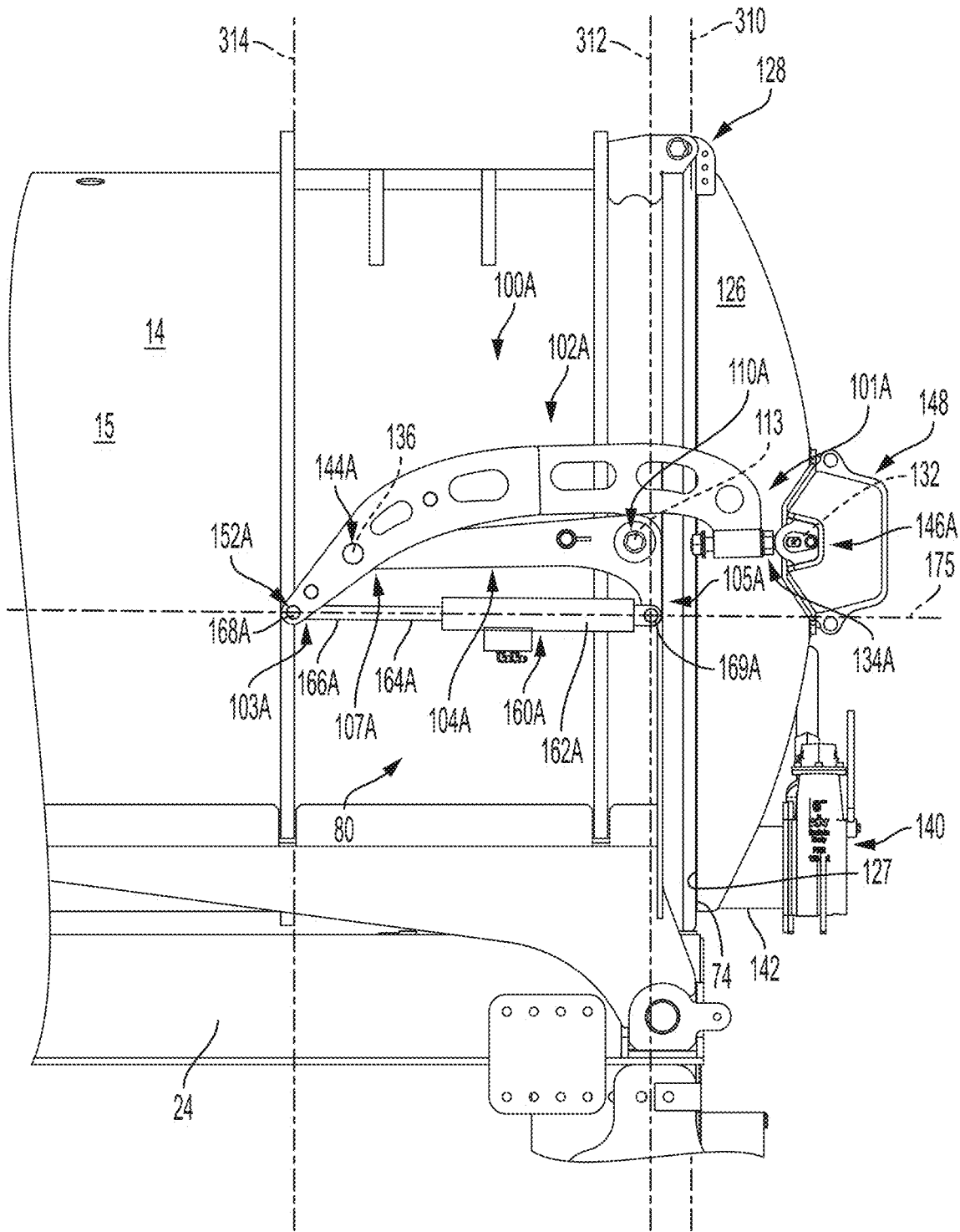
FIGS. 5A and 5B are partial plan side views of the collection tank door system as shown in FIG. 4, in the closed position.
Figure 5B:
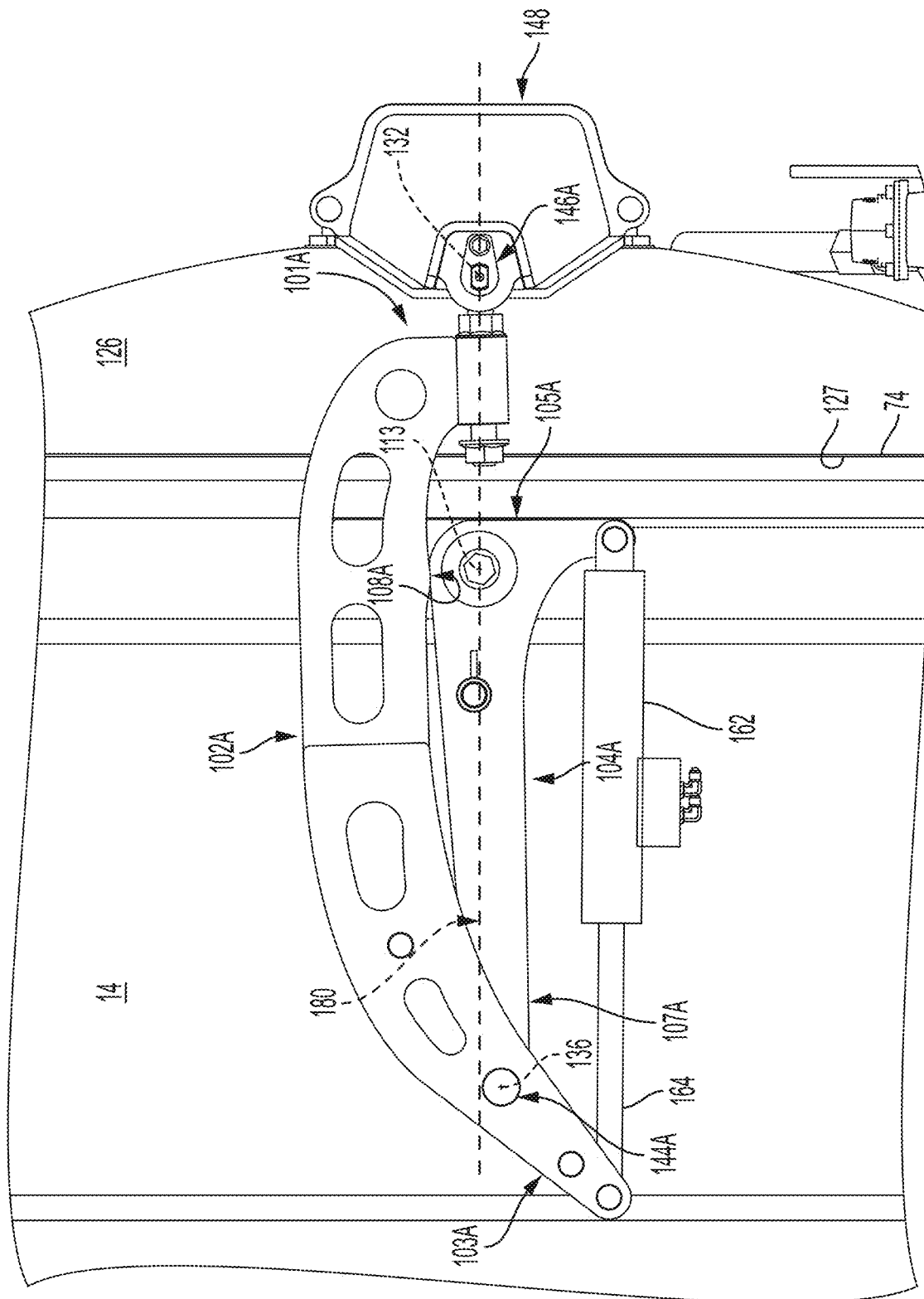

Referring now to FIGS. 4, 5A, and 5B, collection tank 14 is equipped with a sealing flange 74 that defines a perimeter about the tank body's open end 19 (FIG. 8), discharge door 126 that is pivotally connected to the tank body by a pair of slotted hinges 128, and a discharge door latching system 80. Hinges 128 are slotted hinges, thereby allowing the portions of the hinges on the door to move slightly back and forth on the hinge pins in the direction of axis 129 as door 126 pivots to and away from the tank opening. As door 126 moves upward in the opening direction, hinges 128 allow the door's slight movement to allow the door's edge to clear the tank open edge. As door 126 moves down in the closing direction, hinges 128 allow the door to move back in the other direction so that the door seats evenly against the tank open end periphery.

Discharge door latching system 80 has two linkage assemblies 100A and 100B, each including an upper linkage arm 102, a lower linkage arm 104, and an actuator (in the illustrated embodiment, a linear actuator, e.g. a hydraulic cylinder). For ease of discussion, reference will be made primarily to linkage assembly 100A, where all reference numbers are annotated with a capital "A." However, it should be understood that the same components exist for linkage assembly 100B, as a mirror image of linkage assembly 100A.

As should be understood, a linear actuator is an actuator that creates motion in a straight line, which may be referred to as the actuation dimension. Examples of linear actuators include, but are not limited to, mechanical actuators (such as screws, rack and pinion devices, belt drives, hydraulic cylinders, and pneumatic actuators), electro-mechanical actuators, and linear motors. Thus, while hydraulic cylinders are used in the examples described herein, it should be understood that this is for purposes of example only and that other linear and non-linear actuators may be used to drive one or more linkage assemblies as discussed herein.

Referring specifically to FIG. 5A, a lower linkage arm 104A is rigidly connected to a linkage assembly pivot bar 110 (FIG. 8) at the pivot bar's first end 110A so that the lower linkage arm and the pivot bar rotate together. As shown, lower linkage arm 104A is connected to pivot bar 110 at a portion of lower linkage arm 104A that is disposed between a first end 105A and a second end 107A of the lower linkage arm. Pivot bar 110 extends from its first end 110A, through the outer wall of collection tank body 15 (FIGS. 2 and 4), and into a pivot bar/support tube 115 (FIG. 8) that passes through an internal chamber 111 (FIG. 8) of tank 14. The pivot bar is pivotable about an axis 113 oriented generally parallel to an inner diameter of internal chamber 111 (FIG. 8) of collection tank 14. The pivot bar extends along its axis 113 (which is also the pivot bar's elongation dimension) through tank internal chamber 111 and further extends through the opposite side of the collection tank outer wall and terminates at a second end of the pivot bar 110. In embodiments in which the pivot bar 110 extends through the tank internal chamber 111, without a support tube 115 (which may be sealingly attached to through holes through the tank wall to receive the bar), a sealed bearing (not shown) may rotatably engage pivot bar 110 at the point where the pivot bar 110 passes through the collection tank external wall to ensure that tank internal chamber 111 (FIG. 8) remains sealed from the outside atmosphere. As shown in FIG. 8, pivot bar/support tube 115 spans interior 111 of tank 14 and provides structural support to the walls of the tank 14. In other embodiments, both the pivot bar 110 and the support tube 115 may be provided, though not necessarily one within the other as in the embodiments illustrated herein. The rigid connection of lower linkage arms 104A and 104B (FIG. 8) with the respective first and second ends of pivot bar 110 entrains both of the lower linkage arms with pivot bar 110 so that the lower linkage arms 104A, 104B rotate in unison with the pivot bar 110. In another embodiment, pivot bar 110 may be omitted, though the tubing through which it passes may be retained, e.g., for structural support. In such embodiments, each of the two lower linkage arms may be pivotally attached to the tank wall, e.g. about a pin welded or bolted to the tank wall or received within a receiver manufactured into the tank wall.

First end 105A of first lower linkage arm 104A has an actuating cylinder mounting hole (not shown) adjacent its distal end. In one or more embodiments, actuating cylinder 160A is a hydraulic cylinder having a cylinder housing 162A and a piston rod 164A that is slidably received in housing 162A. Piston rod 164A has a free end 166A that is pivotally attached to a cylinder mounting hole 152A formed at the distal end of a second end 103A of first upper linkage arm 102A, e.g. by a pin 168A that extends through both a hole through free end 166A and coaxial hole 152A. The end of cylinder housing 162A is similarly pivotally attached, e.g. by a pin 169A passing through the actuating cylinder mounting hole (not shown) formed in first end 105A of first lower linkage arm 104A and a coaxial hole through the end of cylinder housing 162A. Pins 168A and 169A may pivotally attach piston rod free end 166A and cylinder housing 162A to the respective cylinder mounting holes by clevis, eyebolt or other similar pivotal linkages.

Referring specifically to FIG. 4, upper linkage arm 102A has a forward portion 121 formed in two opposing halves that form a yoke that receives a rearward portion 123. The open rearward end of forward portion 121 receives the forward end of rearward portion 123, and the two ends are fastened to each other, such as by weldment, so that the two portions form a continuous upper linkage arm. The yoke-type or yoke-shaped arrangement of forward portion 121 allows the forward end 107A of lower linkage arm 104A to be received within/between the two yoke halves and, thereby, allows for pivotal connection between the upper and lower linkage arms to be made by a pin 144A that passes through both arms, as explained below. Similarly, the forward free end 166A (FIG. 5A) of cylinder piston rod 164A is also received within/between the two halves of the yoke end of the upper linkage arm so that pin 168A (FIG. 5A) passes through the two yoke halves through corresponding holes 152A and through a hole through forward free end 166A (FIG. 5A) of the cylinder piston rod to pivotally attach the hydraulic cylinder to the upper linkage arm. By such arrangement, the linear actuator, the lower linkage arm, and the upper linkage arm are stacked sequentially with respect to each other in the vertical direction. Thus, for example, actuating cylinder 160A is mounted below upper linkage arm 102A and below lower linkage arm 104A, which is in turn mounted below upper linkage arm 102A, such that a vertical plane, indicated at 125 in FIG. 4, simultaneously passes through the linear actuator, the lower linkage arm, and the upper linkage arm, where plane 125 may be considered to be parallel to the center line (or longitudinal axis) 129 of generally cylindrical tank body 15 or to include the dimension of the force vector applied by door 126 to peripheral flange 74 (FIG. 5A) when the door is closed over the tank open end and the locking force is applied thereto, as described herein. Accordingly, the linear actuator is attached to one of the lower linkage arm and the upper linkage arm and to the tank body so that, when the door is closed over the tank open end, the lower linkage arm, the upper linkage arm, and the linear actuator are disposed with respect to each other so that a plane passes through each of the upper linkage arm, the lower linkage arm, and the linear actuator and includes a direction of bias of the door periphery into the periphery of the tank open end. This stacking arrangement minimizes the distance that linkage assembly 100A (and, similarly, linkage assembly 100B) extends horizontally outward from the tank body 15, thereby allowing a tank diameter that remains within a predetermined overall system width limit but that is larger than would be the case where the linear actuator, the lower linkage arm, and/or the upper linkage arm are not stacked vertically with respect to each other.

Returning to FIGS. 4, 5A, and 5B, pivot pin 144A pivotally connects first lower linkage arm second end 107A with a portion of upper linkage arm 102A that is disposed between its first end 101A and second end 103A, thereby allowing the upper and lower linkage arms to pivot with respect to each other about an axis 136 that passes through pivot pins 144A and 144B as the upper and lower linkage arms move with respect to each other by force applied by the linear actuator, as discussed herein. Axis 136 is generally perpendicular to longitudinal axis 129 and is the axis about which upper linkage arms 102A and 102B pivot with respect to lower linkage arms 104A and 104B. First end 101A of upper linkage arm 102A is configured to adjustably receive a threaded portion of an eye bolt 134A. Eye bolt 134A has an eye (not shown) that is pivotally connected to door 126, and more specifically to a first end 146A of a cross bar 148 that is rigidly secured to a domed panel of discharge door 126 so that the upper linkage arm is pivotable with respect to door 126 about an axis 132 that passes through the eyes of both eye bolts 134A and 134B. Axis 132 is generally perpendicular to longitudinal axis 129 and is the axis about which door 126 (including cross bar 148) pivots with respect to the first ends of the first and second upper linkage arms. Moreover, the threaded connection between upper linkage arm first end 101A and cross bar first end 146A allows for adjustment of the space between the upper linkage arm first end and the cross bar first end in the direction of the bias force vector applied by the door into the tank's open end periphery 74 (FIG. 8).

FIGS. 7 and 8 illustrate collection tank 14 with discharge door 126 in a fully open position, in which piston rod 164A of actuating cylinder 160A (and the piston rod of the opposing linear actuator 160B) is in the retracted position. Linkage assemblies 100A and 100B and pivot bar 110 cooperate with hinges 128 to rotate discharge door 126 between this fully opened position and the sealing engagement with collection tank flange 74 in the door's fully closed position. When closing the discharge door from its fully open position, actuating cylinder 160A begins to extend piston rod 164A. The pivotal pin connection 168A between piston rod free end 166A (FIG. 5A) and second end 103A of upper linkage arm 102A forces upper linkage arm 102A to pivot in the clockwise (CW) direction 154 about pivot point 144A where upper linkage arm 102A is pivotably connected to lower linkage arm 104A. Simultaneously, lower linkage arm 104A begins to pivot in the counter-clockwise (CCW) direction 156 about axis 113 of pivot bar 110. Continued extension of piston rod 164A by actuating cylinder 160A causes discharge door 126 to be similarly rotated in the CW direction 154 about hinges 128, as shown in FIG. 6B.

With reference also to FIG. 2C, actuating cylinder 160B of second linkage assembly 100B simultaneously extends piston rod 164B as actuating cylinder 160A extends piston rod 164A, resulting in closing force being applied simultaneously both to lower linkage arms 104A and 104B by their respective cylinders and, thereby, to pivot bar 110. In certain embodiments, and depending upon the strength of the actuating cylinders and the linkage arms, actuating cylinders 160A and 160B may represent a system redundancy wherein the actuation of either actuation cylinder is sufficient to force both lower linkage arms to rotate due to their rigid attachment to pivot bar 110, when provided. In such embodiments, when pivot bar 110 is used, one of the actuating cylinders may be omitted without altering the function of the discharge door. For example, in an embodiment including only one actuating cylinder, such as first actuating cylinder 160A, a rigid connection between the second lower linkage arm first end 105B and pivot bar second end 110B forces second lower linkage arm 104B to simultaneously rotate in response to the extension of actuating cylinder 160A. Moreover, in such embodiments where two actuating cylinders are provided, should one of the actuating cylinders fail during operation, the other can operate the opening and closing of the door so as to maintain the system's functional integrity. It should be understood that the lower linkage arms do not necessarily need to be rigidly attached to pivot bar 110 but, instead, may be independently (with respect to each other) rotatably attached to the tank body, obviating the need for the pivot bar. Thus, in this configuration, each actuating cylinder would drive its respective lower linkage arm independently of the other actuating cylinder. In certain embodiments, the actuation cylinders may not be sufficiently strong for one of the cylinders to independently drive both linkage assemblies simultaneously. In such and other embodiments, the pivot bar may serve to synchronize the motions of the two linkage assemblies.

In operation, and referring again to FIGS. 2C, 7, and 8, as lower linkage arms 104A and 104B rotate in response to the extension of the cylinder piston rods as described herein, first and second lower linkage arm second ends 107A and 107B rotate in direction 156, allowing upper linkage arm first ends 101A and 101B to move downward with door 126 as first and second upper linkage arms 102A and 102B pivot about pins 144A and 144B, respectively. Upper linkage arms first ends 101A and 101B move downward and toward the collection tank open end, controlling the speed at which discharge door 126 rotates downward about hinges 128 in the direction of arrow 154 by way of the rigid connection between cross bar 148 and the domed portion of discharge door 126. Rotation of discharge door 126 about door hinges 128 causes discharge door 126 to rotate into closing engagement with collection tank sealing flange 74.

Figure 6A:
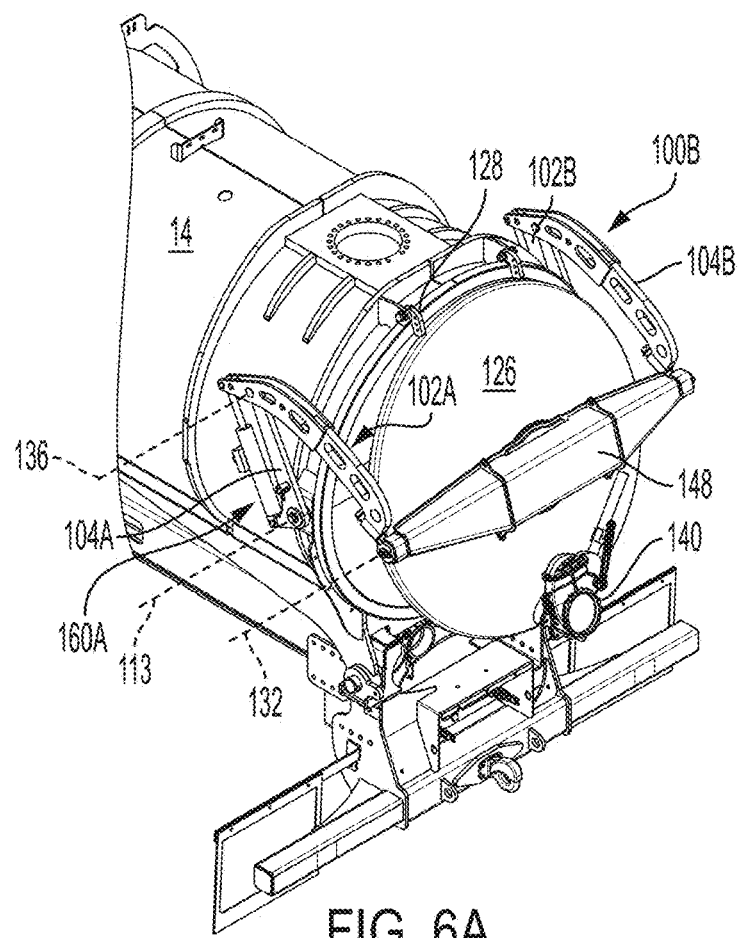
FIGS. 6A and 6B are a partial perspective and a partial plan side view of the collection tank door system as shown in FIG. 4, in a partially open position.
Figure 6B:
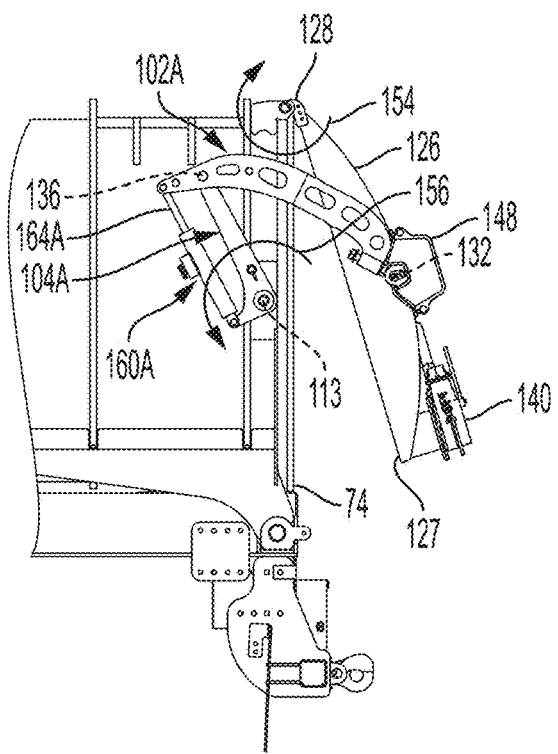

As best seen in FIG. 6B, extension of piston rods 164A and 164B also causes first and second lower linkage arms 104A and 104B to rotate about axis 113 of pivot bar 110 in CCW direction 156 as first and second upper linkage arms 102A and 102B (FIG. 8) rotate about pivot points 144A and 144B. FIGS. 6A and 6B show discharge door 126 in a position between the fully open and fully closed position as piston rods 164A and 164B are only partially extended. Discharge door 126 has a flange 127 about its outer periphery that forms a sealed engagement with collection tank flange 74 once the discharge door is fully closed. It should be understood that a gasket (not shown) may be attached to one of tank flange 74 or door flange 127 to assist in forming an airtight seal when the door in the closed position.

Referring to FIGS. 2C, 4, 5A, and 5B, once discharge door flange 127 seats with tank flange 74, actuating cylinders 160A and 160B continue to extend piston rods 164A and 164B. As the piston rods are further extended, so that the two linkage assemblies move over center, as discussed below, the bottom surface of upper linkage arm 102A makes contact with a portion of the upper surface of lower linkage arm 104A (at 108A-FIG. 5B) forming a rotational stop. The mirror image structure exists within linkage assembly 100B on the opposite side of tank 14. In another embodiment, in which rotational stop 108A is not provided via contact between the upper and lower linkage arms, the rotational stop may comprise a seating bracket (not shown) attached to the side wall of tank body 15 that receives linkage assembly 100A. A similar seating bracket on the opposing side of tank body 15 similarly receives linkage assembly 100B. When linkage assemblies 100A and 100B have rotated sufficiently to make contact with the rotational stops 108A and 108B, and the linkage assemblies are each in an over center locked condition as described herein, the contact between a portion of the linkage assembly and the rotational stop prevents further rotation.

A discharge door locking feature of latching system 80 is now discussed. For purposes of discussion, axis 136 of pivot points 144A and 144B between the upper linkage arm and the lower linkage arm is referred to as the "door latch axis;" axis 132 between the upper linkage arm and the door is referred to as the "door closure axis;" axis 113 of pivot bar 110, i.e. the axis of rotation between the lower linkage arm and the tank body, is referred to as the "mount axis;" and mount axis 113 and its parallel door closure axis 132 define a door latch plane 180 (FIG. 5B). As best seen in FIG. 5B, rotational stop 108A (and a corresponding rotational stop 108B, not shown, defined in the linkage assembly on the tank's opposite side in mirror image) is positioned such that the bottom surface of upper linkage arm 102A contacts the upper surface of lower linkage arm 104A only when door latch axis 136 crosses from a position above door latch plane 180 to a position below door latch plane 180. This condition may be referred to as "rotation beyond over center," and FIG. 5B shows linkage assembly 100A when placed in this position. Because of the simultaneous movement of both linkage assembly 100A and linkage assembly 100B, both linkage assemblies respond identically as they rotate over center.

When door latch axis 136 lies in door latch plane 180 (plane 180 moves from its horizontal position shown in FIG. 5B as the multi-arm linkage assemblies move), upper linkage arm 102A is in tension, and lower linkage arm 104A is in compression, and the forces can be reduced by moving door latch axis 136 out of door latch plane 180 in either the opening direction above door latch plane 180 or in the closing direction below door latch plane 180. By forcing door latch axis 136 (and pivot points 144A and 144B) over center from above to below door latch plane 180 (e.g. to the point at which stop 108A precludes further movement), discharge door 126 is biased into the closed position and will remain in the closed position unless lower linkage arms 104A and 104B are actively moved back, against the opposing over-center force, across the position in door latch plane 180 to a position above door latch plane 180. In embodiments without stops 108A/B, the actuator may prevent further rotational movement.

Note, when the discharge door contacts the open end of the tank during the closure of discharge door 126, the force exerted by actuating cylinder 160A on the door is in a direction away from the door. That is, in moving the door into closing contact with the tank's open end, the force exerted by actuating cylinder 160A (and, correspondingly, by the actuating cylinder on the tank body's opposing side) on the door through the linkage assemblies is in a direction that biases the discharge door toward the tank body's open end. When the door is in the closed position, the force is parallel to axis 129 (FIG. 4).

As apparent in the embodiment illustrated at FIG. 5B, if door latch axis 136 is above (in the perspective of FIG. 5B) door latch plane 180, then when upper linkage arm 102A and lower linkage arm 104A (and, correspondingly, upper linkage arm 102B and lower linkage arm 104B) move pivotally with respect to each other so that door latch axis 136 moves in direction 156 (FIGS. 6B and 7) and door 127 moves in the closing direction indicated at 154 in FIG. 7, first end 101A of upper linkage arm 102A and first end 105A of lower linkage arm 104A (and, correspondingly first end 101B of upper linkage arm 102B and first end 105B of lower linkage arm 104B) move toward each other. Again if door latch axis 136 is above door latch plane 180, then when upper linkage arm 102A and lower linkage arm 104A (and, correspondingly, upper linkage arm 102B and lower linkage arm 104B) move pivotally with respect to each other so that door latch axis 136 moves in the rotational direction opposite to direction 156 (FIGS. 6B and 7) and door 127 moves in the opening direction opposite to the direction indicated at 154 in FIG. 7, first end 101A of upper linkage arm 102A and first end 105A of lower linkage arm 104A (and, correspondingly first end 101B of upper linkage arm 102B and first end 105B of lower linkage arm 104B) move away from each other. After door latch axis 136 passes over center from above to below door latch plane 180, first end 101A of upper linkage arms 102A and first end 105A of lower linkage arm 104A (and, correspondingly, first end 101B of upper linkage arm 102B and first end 105B of lower linkage arm 104B) move slightly apart until stops 108A/B prevent further rotational movement. As will be understood in view of the present disclosure, this slight movement does not disengage door 126 from its engagement with the tank open end perimeter. Similarly, when axis 136 moves in the opposite, opening, CW direction from such position and toward plane 180, first ends 101A/B and 105A/B move slightly toward each other until axis 136 crosses from below to above plane 180, from which point they move away from each other as the door opens.

Actuating cylinders 160A and 160B each includes internal valving, as should be understood, to prevent loss of hydraulic pressure within the cylinder in the event of a pressure bleed off of the hydraulic supply, meaning that the hydraulic lines to the cylinder lose pressure. As such, actuating cylinders remain in the position in which they exist if the hydraulic system experiences pressure loss.

When opening discharge door 126 from the closed position, actuating cylinder 160A retracts piston rod 164A inwardly, causing pivot points 144A, 144B and axis 136 to rotate about axis 113 in a direction opposite to arrow 156 (FIG. 7) to a position above door latch plane 180. This rotation causes upper actuating arm 102A to pivot in the CCW direction about axis 136 of pivot points 144A and 144B, thereby causing discharge door 126 (and axis 132) to pivot upward about a horizontal axis passing through hinges 128. Simultaneously, lower actuating arm 102A begins to rotate in the CW direction about mount axis 113. As previously noted, actuating cylinder 160B may simultaneously retract piston rod 164B as actuating cylinder 160A retracts its piston rod 164A, resulting in a similar opening force applied to upper linkage arms 102A and 102B. Thus, as the lower linkage arms rotate in the opening direction, the upper linkage arms urge the door (e.g. at cross bar 148) to travel opposite the direction indicated by arrow 154 (FIG. 6B). If provided, pivot bar 110 (FIG. 8) also rotates, synchronizing the movements of linkage assemblies 100A and 100B.

As actuating cylinder 160A is disposed between upper and lower linkage arms 102A and 104A (and as the cylinder on the opposing side of the tank body is similarly attached), and travels with them, a shorter cylinder stroke is needed in the illustrated embodiment than would be required if the cylinder were attached directly to the side of tank body 15. Additionally, attaching both operative ends of the cylinder directly to the linkage arms avoids the need to include components for directly attaching the cylinder to the tank body. Moreover, in embodiments in which one end of the actuating cylinder is attached directly to the tank body, but proximate the attachment to the lower linkage arm, a relatively short stroke may still be obtained.

It should be understood that while, in certain embodiments, the hydraulic cylinder is attached to and between one of the upper linkage arm and the lower linkage arm, and the linkage arms are attached to the door and the tank, so that the hydraulic cylinders move the door in the opening direction when the cylinders themselves move in a retracting direction and move the door in the closing direction when the cylinders themselves move in an extending direction, this is for purposes of example only and not limitation of the present disclosure. In other embodiments, the linkage arms may be arranged between the door and the tank body, and the hydraulic cylinders (or other linear actuators) may be arranged between the tank body and the multi-arm linkage assemblies (or within the multi-arm linkage assemblies) so that actuation of the cylinders in the extending direction moves the door in the opening direction and actuation of the cylinders in the retracting direction moves the door in the closing direction. Similarly, while one or more embodiments illustrated or discussed herein provide a linear actuator attached between the tank body and the upper linkage arm to drive the door between the extremes of its movement range, it should be understood from the present disclosure that the linear actuators may be attached between the tank wall and the lower linkage arm for the same purpose. Thus, again, the particular one or more embodiments disclosed herein are for purposes of example and should not be considered to limit the present disclosure.

In one or more embodiments, when discharge door 126 is in the closed position, the linear actuator is oriented so that its direction of operation is generally aligned with the closing or sealing force of the door into the peripheral edge flange 74 (FIG. 8), generally parallel with the tank body's cylindrical axis 129 (FIG. 4). For example, referring to FIG. 5A, a plane 175 that includes the pivot axis through pin 168A (and corresponding pin in the linkage assembly on the opposing side of the tank body) about which upper linkage arm 102A pivots with regard to piston rod free end 166A and that includes the pivot axis through pin 169A (and corresponding pin in the linkage assembly on the opposing side of the tank body) about which the opposing end of the linear actuator is pivotally attached to the lower linkage arm includes the door's bias or force direction (horizontal, in the view of FIG. 5A) and is parallel to tank axis 129 (FIG. 4). This arrangement is achieved through the positioning of the axis of pin 169A vertically below axis 113 by the flange of the lower linkage arm extending between those positions. As shown in FIG. 5A, there is a (slightly smaller) vertical offset between axis 136 and the axis of pivot pin 168A. Thus, the lower linkage arm flange extending below axis 113 locates the axis of pin 169A so that it aligns horizontally with the axis of pin 168A, thereby horizontally aligning the cylinder's operational dimension. In other embodiments, a plane passing through the two pivot axes of the linear actuator may be generally parallel (e.g., plus or minus 10 degrees from parallel) to the tank axis 129 (FIGS. 9B, 10B, 11B, 12B, 13A).

As previously stated, the above discussion is directed primarily to linkage assembly 100A. However, one of skill in the art should understand, in view of the discussion herein, that the discussion also reflects the construction and operation of linkage assembly 100B (FIG. 4), in mirror image. Moreover, while not shown in the figures, one of skill in the art should understand that linkage assemblies 100A and 100B may be operated by a control panel at the back of the vehicle, at a control panel located inside the vehicle, or remotely by a wireless or wired control panel. One or more of these control panels may be provided to operate the automated assembly, among other operations and mechanisms of the machine.

As noted above, the embodiments described above with respect to FIGS. 4-8 attach the linear actuator to and between the two arms of each of the two dual arm linkage assemblies so that the linear actuator moves with movement of both arms of the linkage assembly. In such arrangements, and others discussed herein, the actuator has a relatively short stroke in driving the tank door between the extremes of its range of travel with respect to the tank open end. The linear actuator's disposition in these embodiments, and others disclosed herein, also locate the linear actuator sufficiently closely with the multi-arm linkage assembly that space below the multi-arm linkage assembly is available to secure other components of the system, e.g. the pneumatic hose used to draw slurry into the collection tank of the earth excavator. In certain embodiments described herein, the linear actuator may be attached at one end to one of the upper linkage arm and the lower linkage arm so that the linear actuator moves with movement thereof and at its other end directly to the tank body, though proximate the multi-arm linkage assembly's attachment to the tank, and have a relatively short stroke and allow for the placement of system components under the multi-arm linkage assemblies. Thus, for example with respect to FIGS. 10A and 10B, a linear actuator 360 may be attached at a first operative end of the linear actuator (at 361) to one of the two linkage arms (e.g. upper linkage arm 302) at a second operative end of the linear actuator (at 311) to the tank body proximate the second end of the linkage assembly (attached to the tank body at axis 113) so that actuation of linear actuator 360 in a first direction moves the two linkage arms 302 and 304 pivotally with respect to each other and so that actuation of the actuator in a second direction moves the two linkage arms in the opposite pivotal direction with respect to each other.

In certain embodiments described herein, for example with respect to FIG. 5A, consider the attachment between one end of the linear actuator and the tank body (at 169A), so that a first end of the linear actuator is movable about a pivot point and first axis (the axis through pin 169A coming out of the page, in the perspective of FIG. 5A) that is perpendicular to the generally cylindrical tank's center axis 129 (FIG. 4), and the attachment between the second end of the linear actuator (at 168A) and one of the upper linkage arm and the lower linkage arm (in the example of FIG. 5A, upper linkage arm 102A), so that the linear actuator's second end is movable (with respect to the linkage arm to which it is attached, in this instance linkage arm 102A) about a pivot point and second axis (the axis through pin 168A coming out of the page, in the perspective of FIG. 5A) that is perpendicular to the tank center axis. When door 326 is in its closed position against the open tank end, the first axis is between the second axis and the tank open end. The axis (coming out of and into the page) at pin 169A is between the parallel axis through pin 168A and the tank's open end. It should be noted that the first axis is between the second axis and the open tank end, e.g., because, on a line (in the page of FIG. 5A) passing through both axes and the door opening, the first axis (at pin 169A) is between the other axis (at pin 168A) and the open end, on that line. "Between," however, does not require that the three features be so aligned. Thus, e.g., if the tank door opening is considered with respect to a vertical first plane 310 that includes door opening periphery 74 and that is perpendicular to the tank center line 129 (FIG. 4), and the first axis (at pin 169A) is considered with respect to a vertical second plane 312 that includes the first axis and is perpendicular to the tank centerline, and the second axis (at pin 168A) is considered with respect to a vertical third plane 314 that includes the second axis and that is perpendicular to the tank centerline, then the first axis is between the second axis and the tank open end because second plane 312 is between first plane 310 and third plane 314. One or more of the embodiments discussed below may also illustrate such features.

Figure 9A:
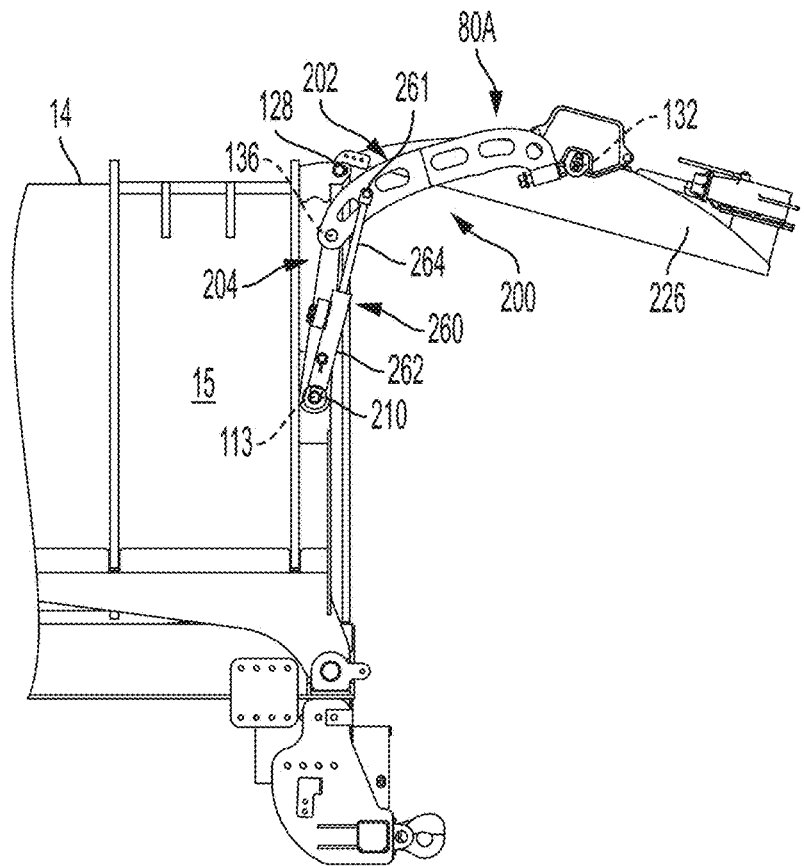
FIGS. 9A and 9B are partial plan side views of an embodiment of a collection tank, including a door system, in accordance with the present disclosure for use with an earth excavator system as at FIG. 1, with certain components hidden.
Figure 9B:
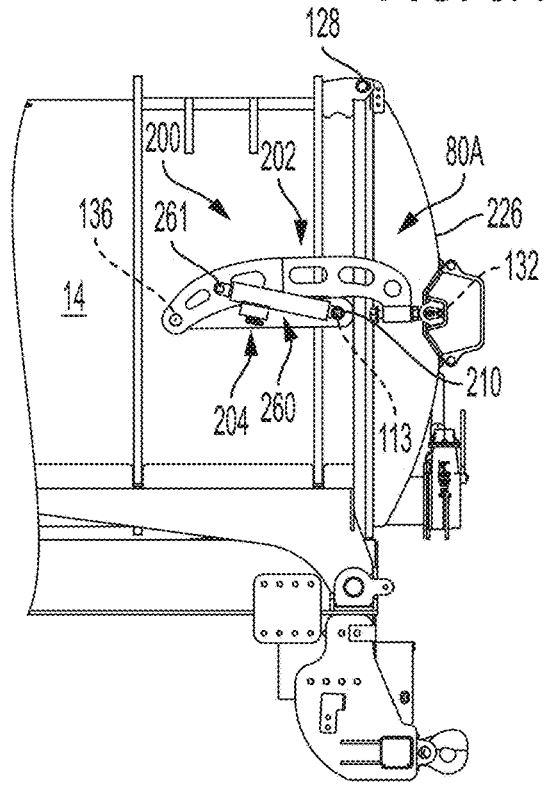

FIGS. 9A and 9B illustrate, e.g., a discharge door latching system 80A for use with a discharge door 226 of a collection tank 14 of an earth excavator system, such as is shown at FIG. 1. Similar to the embodiments of discharge door latching system 80 previously discussed with regard to FIGS. 4 through 8, discharge door latching system 80A includes two linkage assemblies 200, one on each side of collection tank 14. Each linkage assembly 200 includes an upper linkage arm 202, a lower linkage arm 204, and a linear actuator, in this instance a hydraulic cylinder, 260 having a cylinder housing 262 attached to tank body 15 (via the same mounting location by which the lower linkage arm is attached to the tank body) and an extendable piston rod 264 attached to upper linkage arm 202. In the embodiment of FIGS. 9A and 9B, the hydraulic cylinder's attachment to the lower linkage arm and the lower linkage arm's point of attachment to the tank body are joined at the point 210 where the lower linkage arm pivotally attaches to the tank body about axis 113. Thus, cylinder housing 262 pivots about axis 113 both with respect to the tank body and with respect to lower linkage arm 204 as the multi-arm linkage assembly moves between its operative extreme positions. The free end of piston rod 264 is connected to upper linkage arm 202 at a pivotal (e.g. pinned) connection 261 that, when considered along the length of upper linkage arm 202, is between the point (axis 136) at which the upper linkage arm pivotally attaches to the lower linkage arm and the point (axis 132) at which the upper linkage arm pivotally attaches to the door, resulting in reversal of the cylinder's operation directions from that of the embodiments of FIGS. 4-8.

In operation, assume that door 226 is disposed in its fully open position as shown in FIG. 9A. As illustrated in the Figure, cylinder 260 is in its fully extended position. To close the door, the hydraulic control system that controls the cylinder is actuated to cause the cylinder to retract. Since the lower end of cylinder housing 262 is fixed to the tank body at 210, the pinned connection 261 between cylinder rod 264 and upper linkage arm 202 allows upper linkage arm 202 to pivot downward in the CW direction about axis 136 with respect to lower linkage arm 204 (in response to the actuator movement and the door's weight). Simultaneously, lower linkage arm 204 pivots in the CCW direction around axis 113, with the result that axis 136 moves in the CCW direction about axis 113. Retraction of the cylinder to its fully retracted position, as illustrated in FIG. 9B, draws axis 136 over center with respect to the plane defined by axes 113 and 132, as described above, with the periphery of door 226 seated against periphery 74 (FIG. 8) about the tank's open end. To open the door from this position, the cylinder's hydraulic controls are operated to cause it to extend. This pushes upper linkage arm 202 so that it moves in the CW direction about axis 132 and in the CCW direction about its axis 136, and pulls the lower linkage arm (through the pinned connection at axis 136) in the CW direction about axis 113 and the CCW direction about axis 136. The resulting movement of axis 132 to the right (in the perspective of FIG. 9B) causes the door to open about the axis of hinges 128.

Figure 10A:
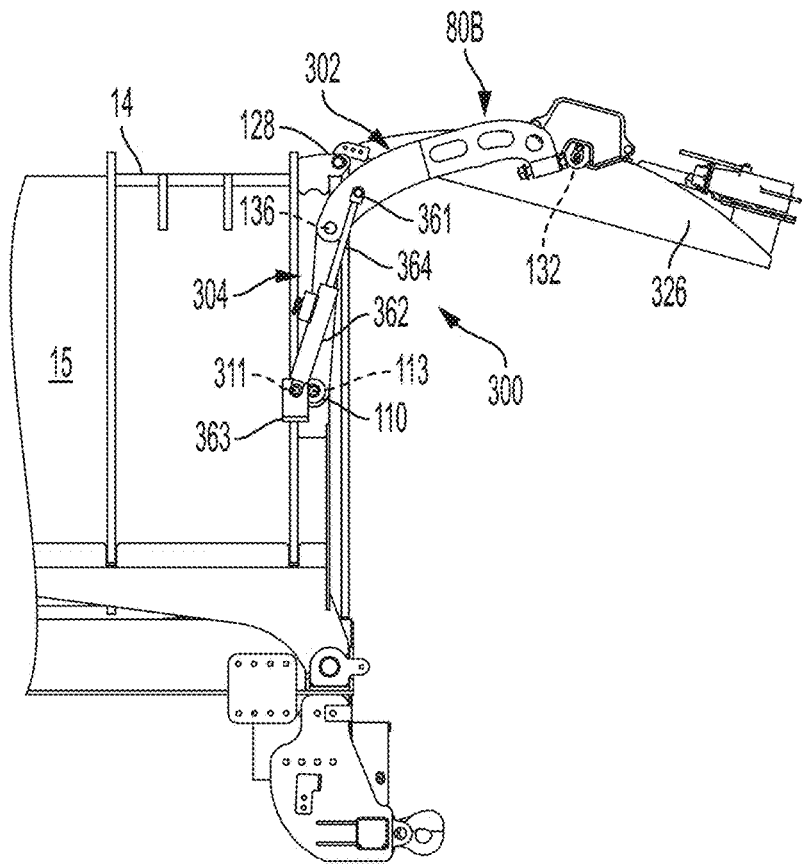
FIGS. 10A and 10B are partial plan side views of an embodiment of a collection tank, including a door system, in accordance with the present disclosure for use with an earth excavation system as in FIG. 1, with certain components hidden.
Figure 10B:
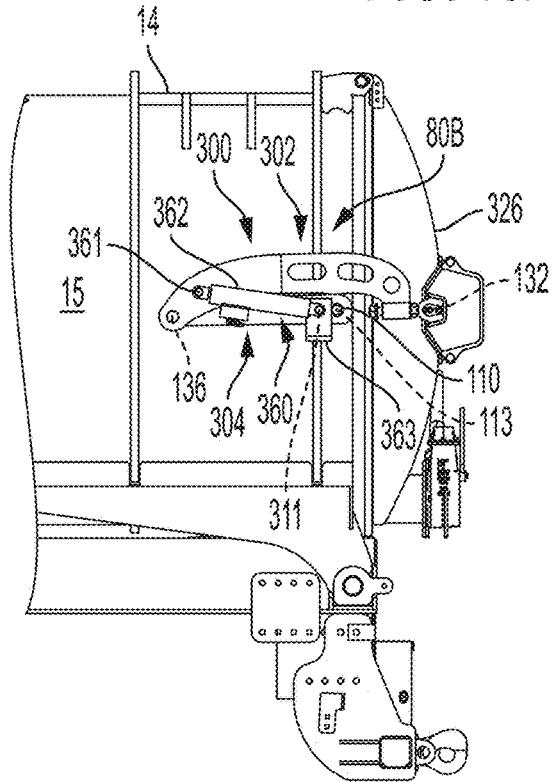

FIGS. 10A and 10B illustrate an embodiment of a discharge door latching system 80B for use with a discharge door 326 of a collection tank 14 of an earth excavator system, such as in FIG. 1, that is similar to the embodiment discussed with respect to FIGS. 9A and 9B, except that the lower end of the hydraulic cylinder is attached to the tank body via a pivotal connection to a bracket attached to the tank body that is not coincident with axis 113, rather than via the pivotal connection of the lower linkage arm to the tank body. Similar to the embodiments of discharge door latching system 80 previously discussed with regard to FIGS. 4 through 8, discharge door latching system 80B includes two linkage assemblies 300, one on each side of tank 14. Each linkage assembly 300 includes an upper linkage arm 302, a lower linkage arm 304, and a linear actuator, in this instance a hydraulic cylinder, 360 having a cylinder housing 362. Cylinder housing 362 is attached to the tank body via a pivotal connection to a bracket 363 that is affixed to the side wall of tank body 15, rather than via the pivotal connection of lower linkage arm 304 to the tank body. The cylinder's extendable piston rod 364 is pivotally attached to upper linkage arm 302 through a pivot pin connection at 361. While cylinder housing 362 is pivotally attached to the tank body about an axis 311 (extending into and out of the page of FIGS. 10A and 10B) of a pivot pin connection, the pivotal connection between the cylinder housing and the tank at 311 remains proximate the position at which one end of the linkage assembly (in this instance, the lower linkage arm) attaches to the tank body. In this embodiment and the embodiments of FIGS. 4-8 (see FIG. 5A) and 9A-9B (see FIG. 9A), the linear actuator is attached at a first operative end to one of the upper and lower linkage arms and at its opposite second operative end to the tank body so that, when the door is closed over the tank body's open end, the axis about which the cylinder's second operative end moves with respect to the tank body is between the axis about which the cylinder's first operative end moves with respect to the one of the upper and lower linkage arm and the tank body open end. The operation of the embodiment illustrated in FIGS. 10A and 10B in moving the multi-arm linkage between its extreme positions is similar to the corresponding operation of the embodiment of FIGS. 9A and 9B.

Figure 11A:
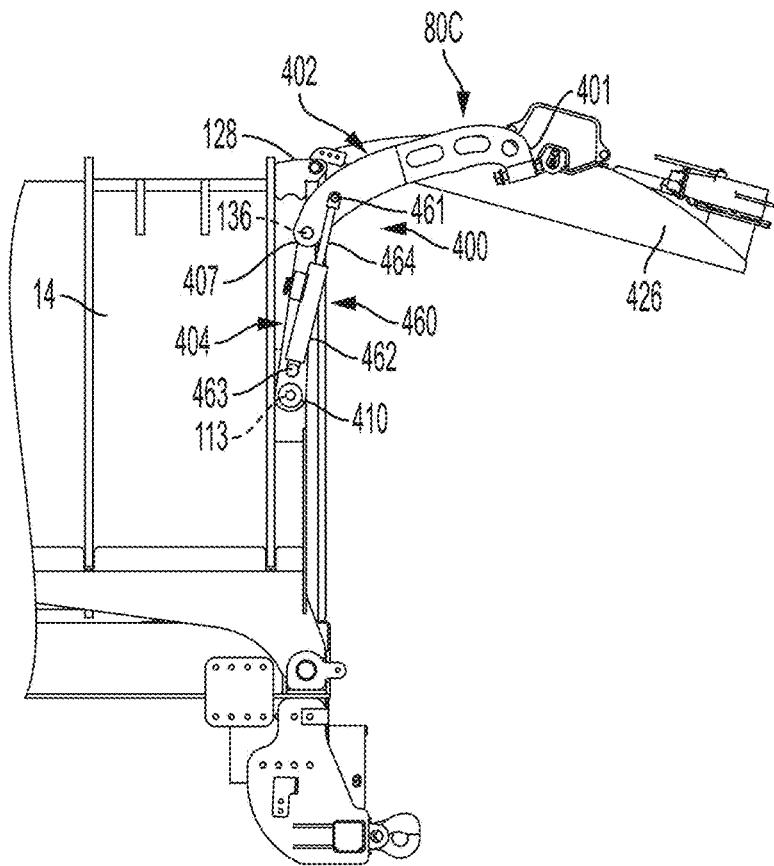
FIGS. 11A and 11B are partial plan side views of an embodiment of a collection tank, including a door system, in accordance with the present disclosure for use with an earth excavation system as in FIG. 1, with certain components hidden.
Figure 11B:
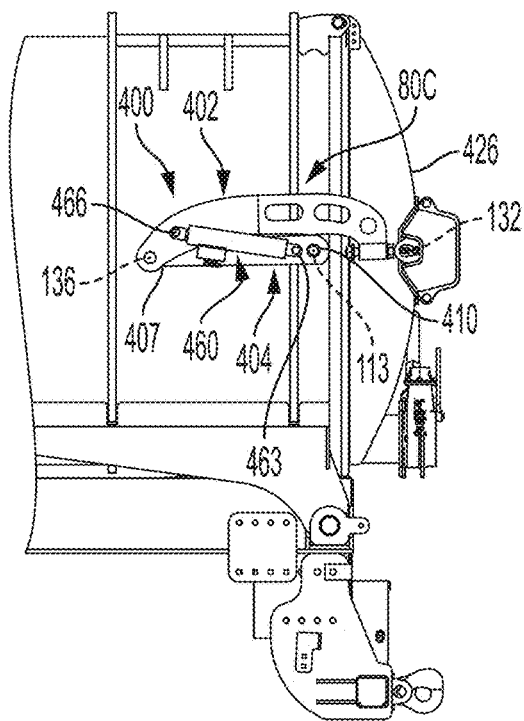

FIGS. 11A and 11B illustrate an embodiment of a discharge door latching system 80C for use with a discharge door 426 of a collection tank 14 of an earth excavator system, such as in FIG. 1, that is similar to the embodiment discussed with respect to FIGS. 9A and 9B, except that the lower end of the hydraulic cylinder is attached to the lower linkage arm at a point on the lower linkage arm offset from the lower linkage arm's pivotal connection to the tank body, rather than directly at the pivotal connection of the lower linkage arm to the tank body. Similar to the embodiments of discharge door latching system 80 previously discussed with regard to FIGS. 4 through 8, discharge door latching system 80C includes two linkage assemblies 400, one on each side of tank 14. Each linkage assembly 400 includes an upper linkage arm 402, a lower linkage arm 404, and a linear actuator, in this instance a hydraulic cylinder, 460 having a cylinder housing 462 attached to lower linkage arm 404 and an extendable piston rod 464 attached to upper linkage arm 402. Cylinder housing 462 is pivotally attached to lower linkage arm 404 at a pinned connection 463 that is offset (along the length of the lower linkage arm) from the pivotal connection between the lower linkage arm and the tank body at pivot pin connection 410. Thus, cylinder housing 462 pivots about pinned connection 463 (about an axis extending into and out of the page of FIGS. 11A and 11B), and also about axis 113, as the multi-armed linkage assembly moves between its extreme positions during its operation as disclosed herein.

Like the embodiments described with respect to FIGS. 4-8, the linear actuator of the embodiment illustrated in FIGS. 11A and 11B are attached directly to and between the lower linkage arm and the upper linkage arm. In this embodiment and the embodiments of FIGS. 4-8 and 9A-9B, the cylinder is attached at one operative end to the upper linkage arm and at its other operative end to the tank body via the lower linkage arm. In this embodiment and the embodiment of FIGS. 4-8, 9A-9B, and 10A-10B, the linear actuator is attached at a first operative end to one of the upper and lower linkage arms so that the first operative end moves with movement of the one of the upper and lower linkage arms and at its opposite second operative end to the tank body (in this instance, via the lower linkage arm so that the second operative end moves with the lower linkage arm) so that, when the door is closed over the tank body's open end, the axis about which the cylinder's second operative end moves with respect to the tank body is between the axis about which the cylinder's first operative end moves with respect to the one of the upper and lower linkage arm and the tank body open end.

The operation of the embodiment illustrated in FIGS. 11A and 11B is similar to the operation of the embodiment illustrated in FIGS. 9A and 9B, referenced above.

Figure 12B:
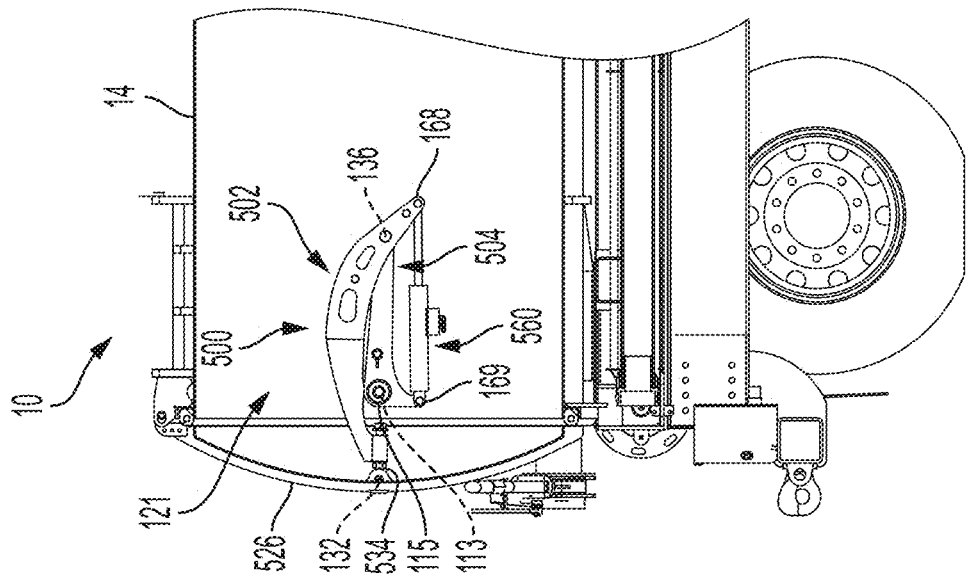
FIGS. 12A, 12B, and 12C are a rear view, a partial cross-sectional view, and a partial cross-sectional view of an embodiment of a collection tank, including a door system, in accordance with the present disclosure for use with an earth excavation system as in FIG. 1, with certain components hidden; and Each of FIGS. 13A, 13B, 13C, 13D, and 13E is a side schematic view of an embodiment of a door system in accordance with the present disclosure for use with a collection tank of an earth excavation system as in FIG. 1.
Figure 12A:
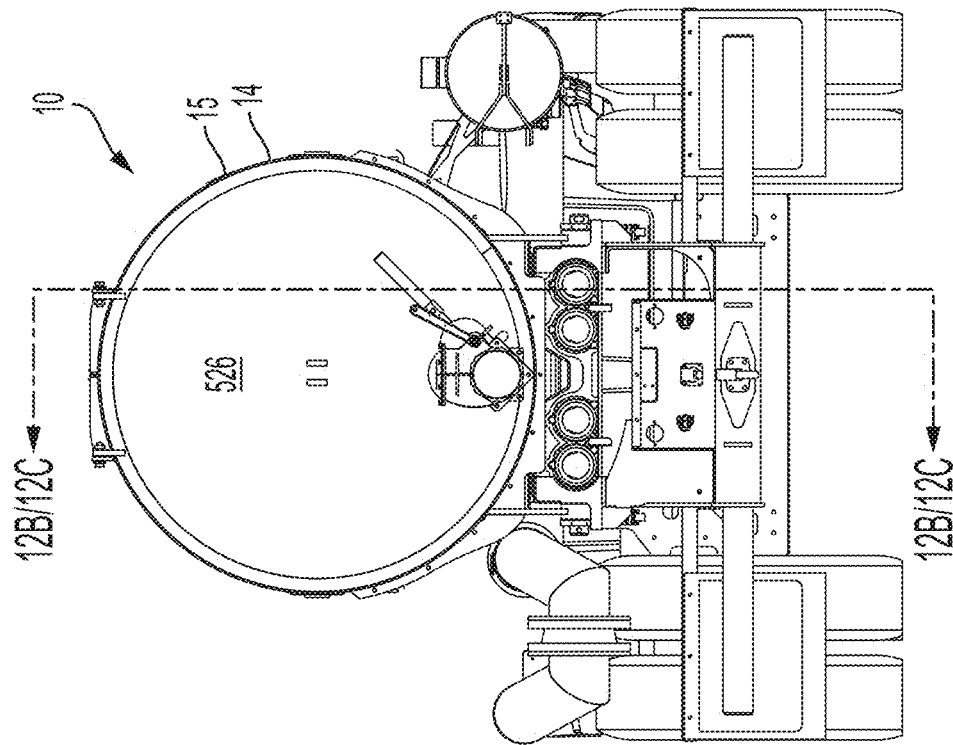
Figure 12C:
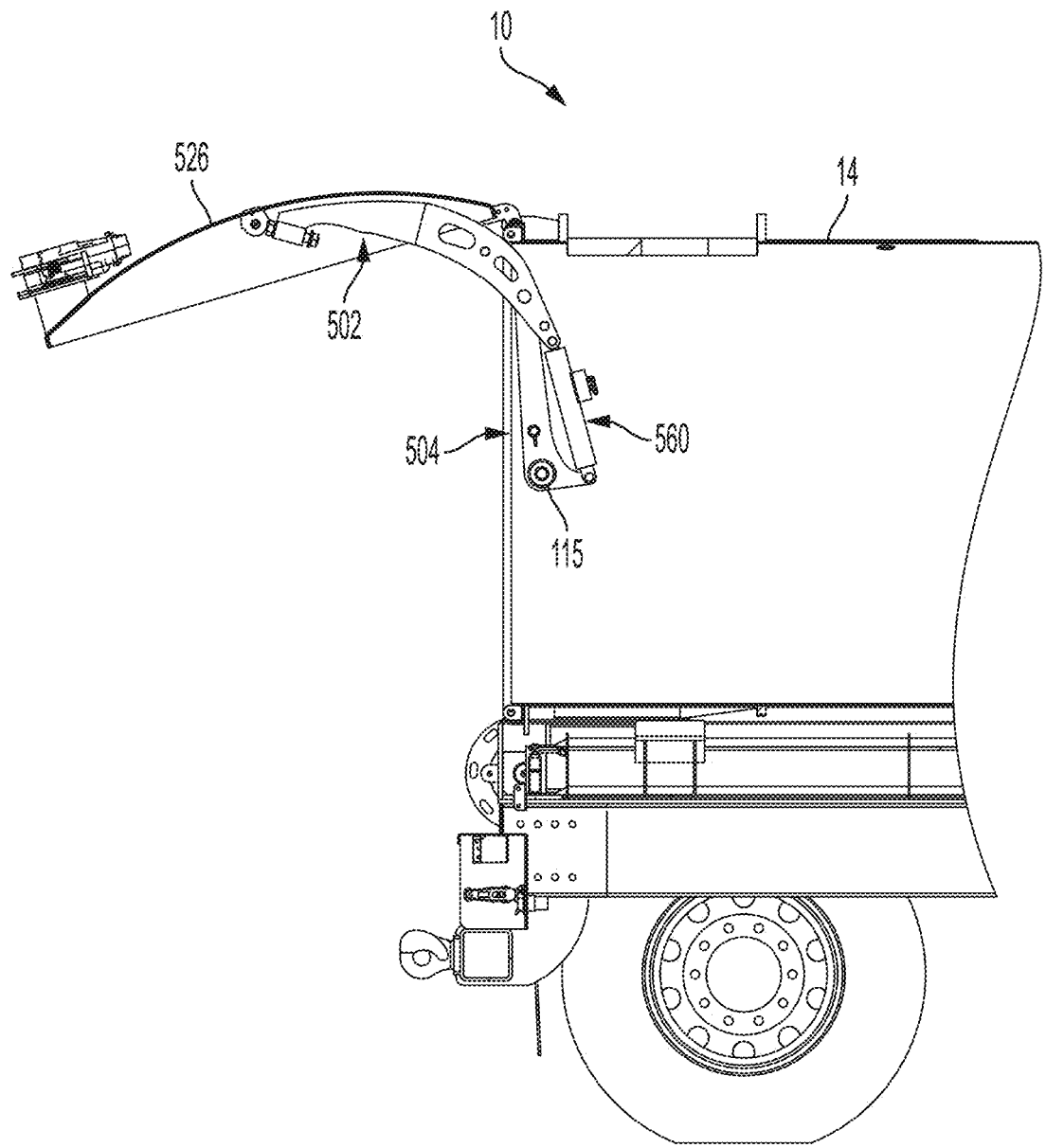

FIGS. 12A, 12B, and 12C illustrate a discharge door latching system 80D for use with a discharge door 526 of a collection tank 14 of an earth excavator system 10, such as is also shown at FIG. 1. Similarly to the embodiments of discharge door latching system 80 previously discussed with regard to FIGS. 4 through 8, discharge door latching system 80D includes a linkage assembly 500 on both sides of tank 14, each having an upper linkage arm 502, a lower linkage arm 504, and a linear actuator, in this instance a hydraulic cylinder, 560 having a cylinder housing 562 mounted to lower linkage arm 504 and an extendable piston rod 564 mounted to upper linkage arm 502. The connection points between upper linkage arm 502, lower linkage arm 504, and actuating cylinder 560 of linkage assembly 500 are the same as those of upper linkage arm 102, lower linkage arm 104, and actuating cylinder 160 of linkage assembly 100 of the embodiments of FIGS. 4-8 (see, e.g., FIG. 5A). However, latching system 80D differs from latching system 80 in that rather than attaching linkage assembly 500 adjacent an outer surface of tank body 15 of tank 14, linkage assembly 500 is mounted inside of tank 14, within internal chamber 111 (see, also, FIG. 8). In this embodiment, lower linkage arm 504 is attached to the tank body, not at an end of pivot bar 110 as in the embodiments of FIGS. 4-8, but rather at the center of the support tube 115 (see also FIG. 8). The through hole through lower linkage arm 504 may be fitted with a bearing assembly to facilitate the lower linkage arm's rotation about axis 113 that extends through the center of support tube 115, into and out of the page in the perspective of FIG. 12B.

The end of upper linkage arm 502 opposite the upper linkage arm's end that attaches to lower linkage arm 504 at the pinned connection that defines axis 136 is configured to adjustably receive a threaded portion of an eye bolt 534. Eye bolt 534 has an eye (not shown) that is pivotally attached in a pinned connection (a pin may be connected to the inner panel, e.g., by tabs welded to the panel) to the interior surface of the domed panel portion of door 526 (e.g. at the center of the domed panel) so that upper linkage arm 502 is pivotable with respect to door 526 about axis 132, which extends into and out of the page of the view of FIG. 12B.

Because, in this embodiment, the (a) vertical offset between (i) the connection between the first end of the linear actuator and the upper linkage arm at 168 and (ii) the connection between the two linkage arms at axis 136 and (b) the vertical offset between (iii) the connection between the second end of the linear actuator and the lower linkage arm at the axis through 169 and (iv) the connection between the lower linkage arm and the tank body at axis 113 aligns the hydraulic cylinder horizontally when the door closes on the tank's open end, the linear actuator's (in this instance, the hydraulic cylinder's) direction of operation is aligned entirely with the door's bias force direction when the door is closed against the tank's open end, as in the embodiment of FIGS. 4-8. Because, in this embodiment, the connection between the upper and lower linkage arms at axis 136 is between (when considered along the length of the upper linkage arm) the connection between the piston rod and the upper linkage arm at the axis of pinned connection 168, the operation of the cylinder's extension and retraction in moving the multi-arm linkage between its extremes of position is the same as that of the embodiments of FIGS. 4-8. In this embodiment, the cylinder is attached at one operative end to the upper linkage arm and at its other operative end to the tank body via the lower linkage arm. The linear actuator is attached at a first operative end to one of the upper and lower linkage arms and at its opposite second operative end to the body so that, when the door is closed over the tank body's open end, the axis about which the cylinder's second operative end moves with respect to the tank body is between the axis about which the cylinder's first operative end moves with respect to the one of the upper and lower linkage arm and the tank body open end. It will be understood that hydraulic fluid lines may be directed through sealed openings in the tank body wall to reach the cylinder for its operation.

FIGS. 13A-13E illustrate a discharge door latching system 80E for use with a discharge door 626 of a collection tank 14 of an earth excavator system, such as is shown at FIG. 1. Similar to the embodiments of discharge door latching system 80 previously discussed with regard to FIGS. 4 through 8, discharge door latching system 80E includes two linkage assemblies 600, one on each side of tank 14. Each linkage assembly 600 includes an upper linkage arm 602, a lower linkage arm 604, and a linear actuator, in this instance a hydraulic cylinder, 660 having a cylinder housing 662 attached to tank body 15 via a pinned connection at 611 (which may also be considered to define an axis 611 extending into and out of the page of the view of FIGS. 13A-13E and about which cylinder housing 662 pivotally moves as the multi-arm linkage assembly moves between its extreme positions) and an extendable piston rod 664 attached to lower linkage arm 604 at a pinned connection 168. Upper linkage arm 602 and lower linkage arm 604 are pivotally connected at a pinned connection that defines an axis 136 about which the upper and lower linkage arms pivot with respect to each other as they move through the motion driven by the linear actuator.

First end 601 of upper linkage arm 602 is configured to adjustably receive a threaded portion of an eye bolt 134. Eye bolt 134 has an eye (not shown) that is pivotally connected to door 626, and more specifically to a first end of a cross bar (see, e.g., FIG. 4, at 148) that is rigidly secured to a domed panel of discharge door 126 so that the upper linkage arm is pivotable with respect to, and pivotally attached to, door 626 about an axis 132 that passes through the eyes of the eye bolts 134 on both sides of the tank body. Axis 132 is generally perpendicular to longitudinal axis 129 (FIG. 4) and is the axis about which door 626 (including the cross bar) pivots with respect to the first ends of the first and second upper linkage arms. Moreover, the threaded connection between upper linkage arm first end 601 and the corresponding end of the cross bar allows for adjustment of the space between the upper linkage arm first end and the cross bar end in the direction of the bias force vector applied by the door into the tank's open end periphery 74 (see also FIG. 8).

The free end of piston rod 664 is connected to lower linkage arm 604 at a pivotal (e.g. pinned) connection 168 that, when considered along the length of lower linkage arm 604, is between the point (axis 113) at which the lower linkage arm pivotally attaches to the tank body and the point (axis 136) at which the lower linkage arm pivotally attaches to the upper linkage arm. Like the embodiments of FIGS. 4-8, the hydraulic cylinder of the embodiment illustrated in FIGS. 13A-13E retracts in moving door 626 from its position closed over the open tank end to its opened position disposed away from the open tank end and extends in moving the door from the fully opened position to the fully closed position.

The linear actuator is attached at a first operative end to one of the upper and lower linkage arms and at its opposite second operative end to the body so that, when the door is closed over the tank body's open end, the axis about which the cylinder's second operative end moves with respect to the tank body is between the axis about which the cylinder's first operative end moves with respect to the one of the upper and lower linkage arm and the tank body open end.

Figure 13C:
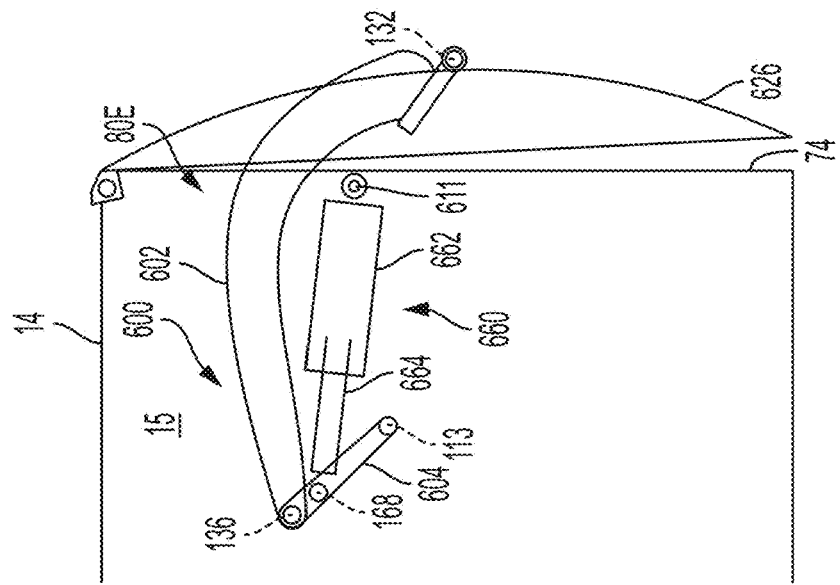
Figure 13B:
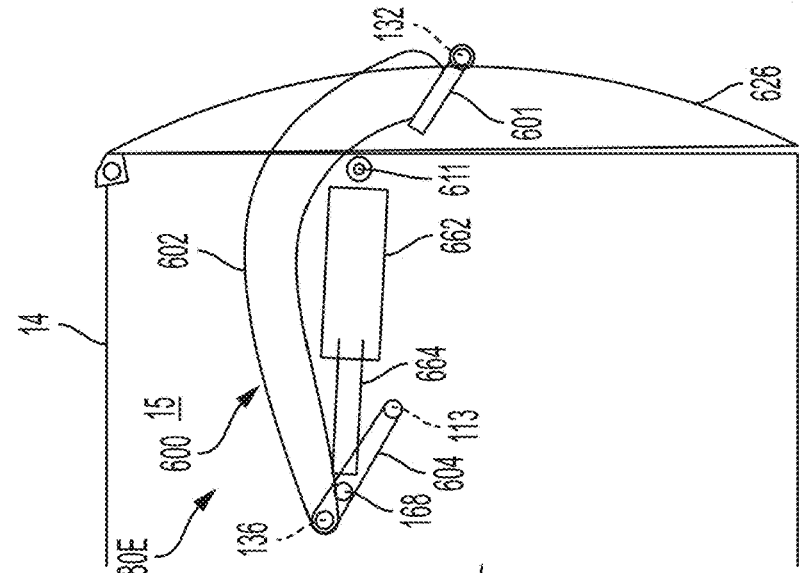
Figure 13A:
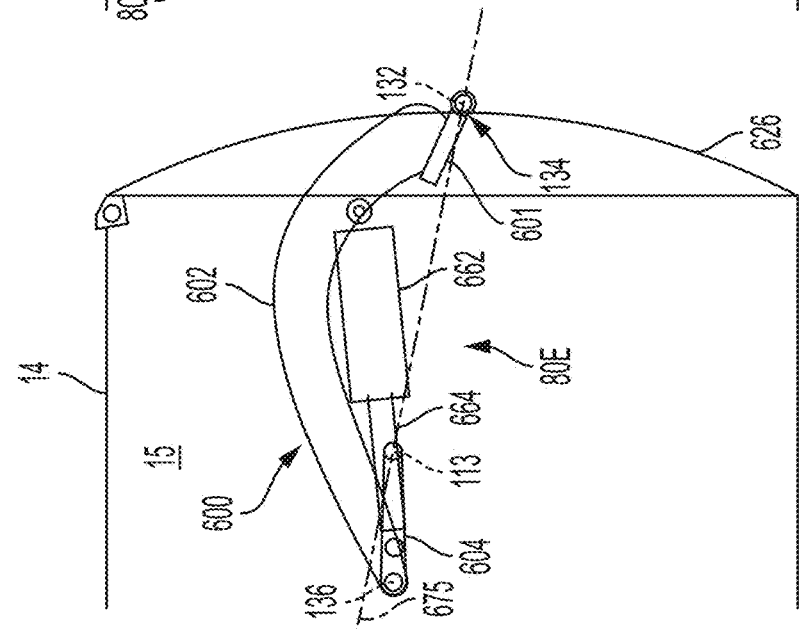
Figure 13E:
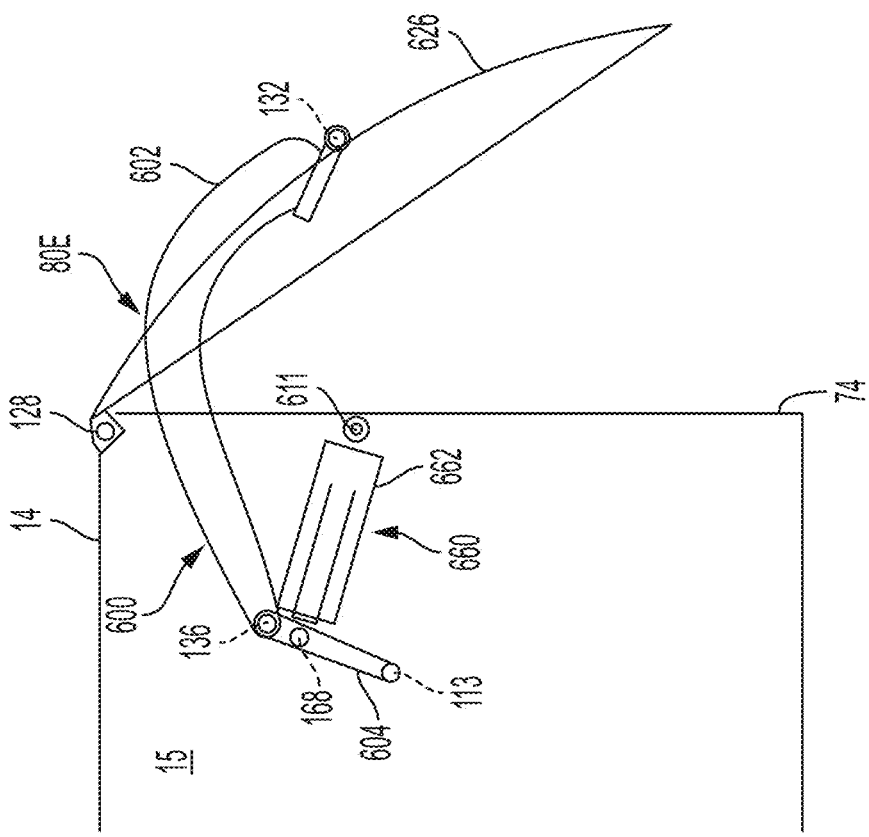
Figure 13D:
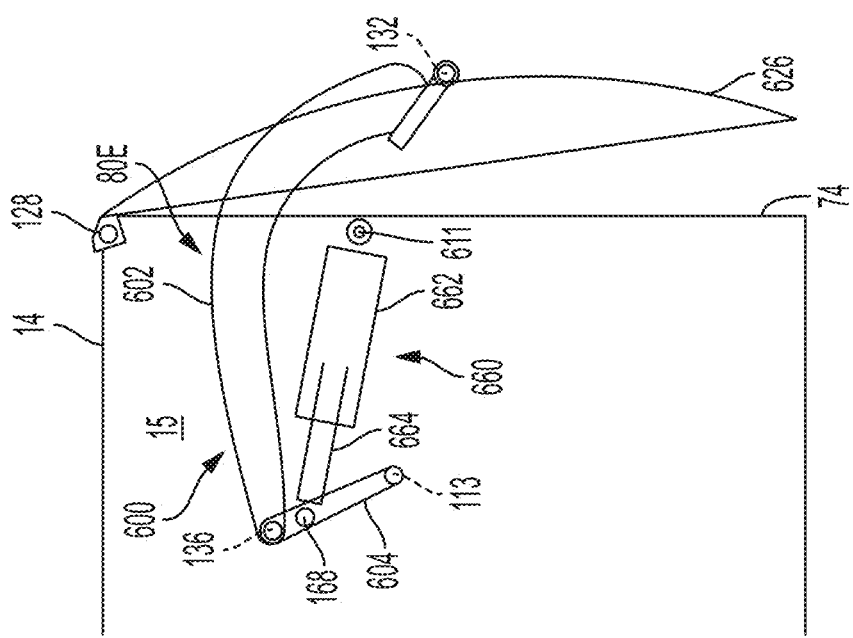

In operation, assume that door 626 is disposed in its fully open position as shown in FIG. 13E. As illustrated in the Figure, cylinder 660 is in its fully retracted position. To close the door, the hydraulic control system that controls the cylinder is actuated to cause the cylinder to extend. Since the lower end of cylinder housing 262 is fixed to the tank body at 611, this causes piston rod 664 to push lower linkage arm 604 in the CCW direction about axis 113, thereby causing upper linkage arm 602 to pivot in the CW direction about axis 136 with respect to lower linkage arm 204, with the result that axis 136 moves in the CCW direction about axis 113 and that door 626 pivots in the CW direction about the axis (in and out of the page of these figures) defined by hinges 128. Extension of the cylinder to its fully extended position, as illustrated in FIG. 13A, draws axis 136 over center with respect to a plane 675 (coming into and out of the page of FIG. 13A) defined by axes 113 and 132, as described above, with the periphery of door 226 seated against periphery 74 (see also, FIG. 8) about the tank's open end. To open the door from this position, the cylinder's hydraulic controls are operated to cause it to retract. This pulls lower linkage arm 602 so that so that it moves in the CW direction about axis 113 and pushes the upper linkage arm (through the pinned connection at axis 136) in the CCW direction about axis 136. This causes the door to open to the right (in the perspective of FIGS. 13A-13E) and the door to thereby pivot in the CCW direction about the axis of the door hinges 128. The resulting movement of axis 132 to the right (in the perspective of FIGS. 13A-13E) causes the door to open about the axes of the hinges 128 to the fully opened position, as shown at FIG. 13E.

It should be appreciated by those skilled in the art that various modifications and variations can be made in the present disclosure without departing from the scope and spirit of the disclosure. It is intended that the present disclosure cover such modifications and variations as come within the scope and spirit of the appended claims and their equivalents.

What is claimed is:

1. A collection tank for a mobile vacuum excavator, the collection tank comprising:
    a generally cylindrical body having
        a front with a closed end, and
        a rear with an open end having a periphery;
    a door having a periphery that abuts the periphery of the open end when the door is closed over the open end; and
    a linkage assembly having a first end attached to the door so that the first end moves with movement of the door, and a second end attached to the body, wherein the linkage assembly comprises
        a first arm,
        a second arm pivotally attached to the first arm, and
        an actuator attached to the first arm and to the second arm.

2. The collection tank of claim 1, wherein the first arm is attached to the body at the first end of the linkage assembly, and wherein the second arm is attached to the door at the second end of the linkage assembly.

3. The collection tank of claim 1, wherein the actuator is a hydraulic cylinder.

4. The collection tank of claim 1, wherein the first arm and the second arm are disposed with respect to each other so that, when the door moves to a closed position with respect to the collection tank, a pivotal attachment between the first arm and the second arm moves over center.

5. The collection tank of claim 1, wherein
    the first arm is pivotally attached to the body at a body mounting end about a mount axis,
    the second arm is pivotally attached to the door at a door mounting end about a door closure axis, so that the door mounting end moves with movement of the door, and the second arm is pivotally attached to the first arm at a door latch axis so that a first pivotal movement of the first arm and the second arm with respect to each other drives the body mounting end of the first arm and the door mounting end of the second arm relatively away from each other, and so that a second pivotal movement of the first arm and the second arm with respect to each other drives the body mounting end of the first arm and the door mounting end of the second arm relatively toward each other,
    wherein a door latch plane is defined by the mount axis and the door closure axis, and
    wherein the door latch axis is on one side of the door latch plane when the actuator is in a retracted state and the door latch axis is on an opposite side of the door latch plane when the actuator is in an extended state.

6. A collection tank for a mobile vacuum excavator, comprising:
    a generally cylindrical body having
        a front with a closed end, and
        a rear with an open end having a periphery;
    a door having a periphery that abuts the periphery of the open end when the door is closed over the open end; and
    a linkage assembly comprising:
        a first arm pivotally attached to the body at a mounting end about a mount axis,
        a second arm pivotally attached to the door at a mounting end about a door closure axis, wherein the second arm has a distal end and wherein a door latch plane is defined by the mount axis and the door closure axis, and
        a powered cylinder actuator attached to the first arm and to the second arm so that the actuator moves with movement of the first arm and with movement of the second arm,
    wherein the door latch axis is on one side of the door latch plane when the actuator is in a retracted state and the door latch axis is on an opposite side of the door latch plane when the actuator is in an extended state.

7. The collection tank of claim 6, wherein the first arm and the second arm are pivotally attached to one another such that a first pivotal movement of the first arm and the second arm with respect to each other drives the mounting end of the second arm and the mounting end of the first arm relatively away from each other, and so that a second pivotal movement of the first arm and the second arm with respect to each other moves the mounting end of the second arm and the mounting end of the first arm relatively toward each other.

8. The collection tank of claim 6, wherein actuation of the powered cylinder actuator in a first direction moves the first arm and the second arm in a first pivotal movement, and so that actuation of the powered cylinder actuator in a second direction moves the first arm and the second arm in a second pivotal movement.

9. The collection tank of claim 6, wherein the linkage assembly is a first linkage assembly disposed on a first side of the collection tank, and further comprising a second linkage assembly attached to and between the door and the body on a second side of the collection tank, opposite the first side.

10. The collection tank of claim 6, wherein the linkage assembly is disposed inside the body.

11. The collection tank of claim 6, wherein the powered cylinder actuator is a hydraulic cylinder.

* * * * *